US 11,449,920 B1

(12) United States Patent
Adams et al.

(10) Patent No.: US 11,449,920 B1
(45) Date of Patent: Sep. 20, 2022

(54) PROVIDING ADD-ONS FOR NETWORK APPLICATIONS

(71) Applicant: Amazon Technologies, Inc., Seattle, WA (US)

(72) Inventors: Matt Adams, Seattle, WA (US); Anjana Singh, Bothell, WA (US); Prateek Thukral, Seattle, WA (US); Kapil Gulati, Redmond, WA (US); Himanshu Soni, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 16/712,198

(22) Filed: Dec. 12, 2019

(51) Int. Cl.
*G06Q 30/06* (2012.01)
*G06F 9/445* (2018.01)
*G06F 8/65* (2018.01)
*G06F 16/9035* (2019.01)
*A63F 13/77* (2014.01)
*H04W 76/10* (2018.01)
*H04L 67/306* (2022.01)
*A63F 13/792* (2014.01)
*H04L 67/131* (2022.01)

(52) U.S. Cl.
CPC ......... *G06Q 30/0631* (2013.01); *A63F 13/77* (2014.09); *A63F 13/792* (2014.09); *G06F 8/65* (2013.01); *G06F 9/44526* (2013.01); *G06F 16/9035* (2019.01); *H04L 67/131* (2022.05); *H04L 67/306* (2013.01); *H04W 76/10* (2018.02); *A63F 2300/552* (2013.01); *A63F 2300/5513* (2013.01)

(58) Field of Classification Search
CPC ................................................ G06Q 30/0631
See application file for complete search history.

(56) References Cited

U.S. PATENT DOCUMENTS

| 2012/0004039 | A1* | 1/2012 | Perry | A63F 13/335 463/42 |
| 2012/0064976 | A1* | 3/2012 | Gault | H04N 21/4781 463/42 |
| 2020/0139231 | A1* | 5/2020 | Colenbrander | A63F 13/79 |

* cited by examiner

Primary Examiner — Hsinchun Liao
(74) Attorney, Agent, or Firm — Lee & Hayes, P.C.

(57) ABSTRACT

This disclosure describes, in part, techniques for providing add-ons associated with network applications. For instance, a user may be controlling an application that is executing on a remote system using a control device and a display device. While the application is executing, the remote system may send user interface data to the display device, where the user interface data represents a user interface that includes add-ons that may be acquired for the application. If the user selects an add-on, the display device may communicate with a payment system in order to acquire the add-on. The remote system may then determine that the user acquired the add-on using data received from the display device and/or data received from a management system associated with the application. As such, the remote system may enable the add-on for the user within the application.

20 Claims, 18 Drawing Sheets

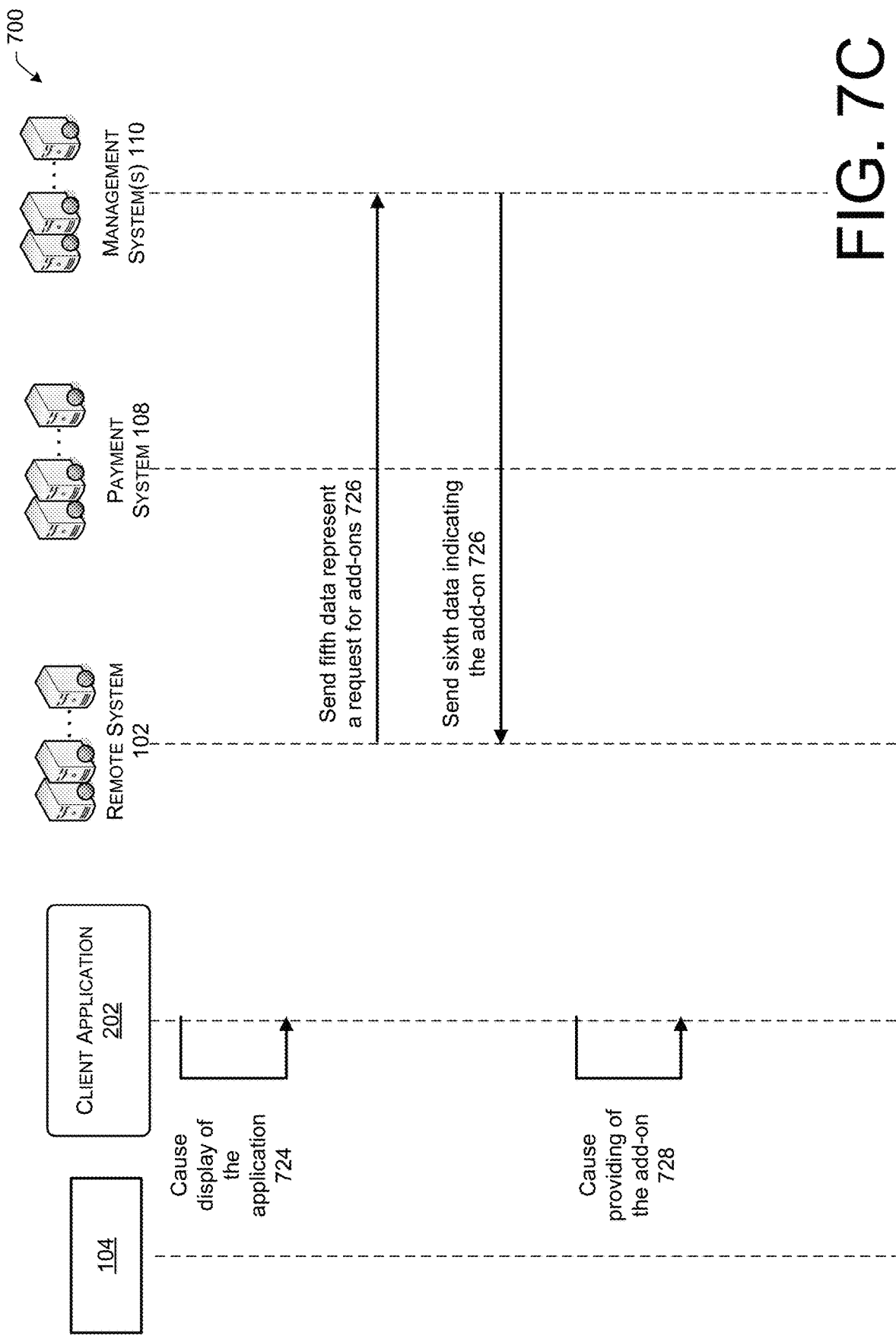

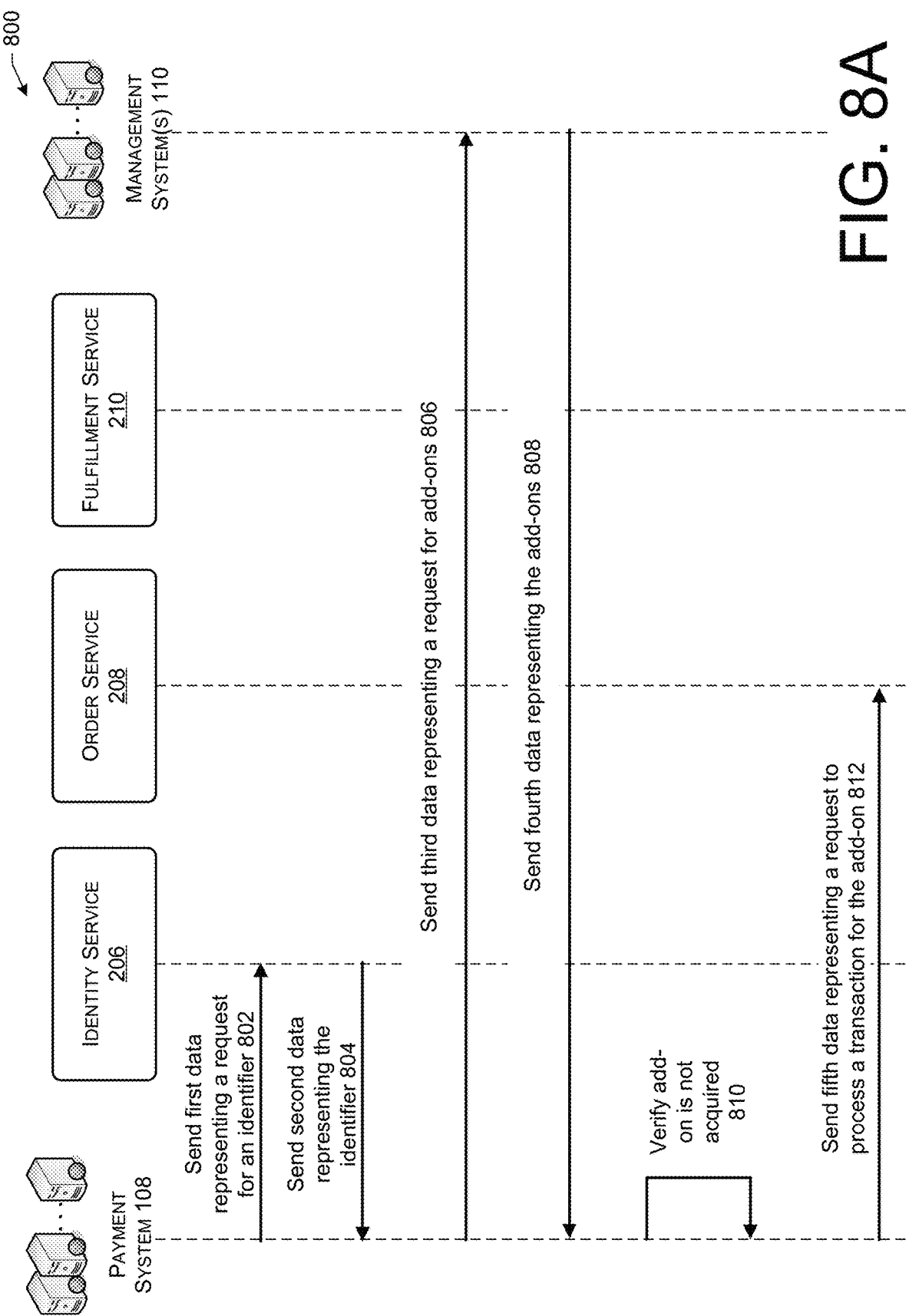

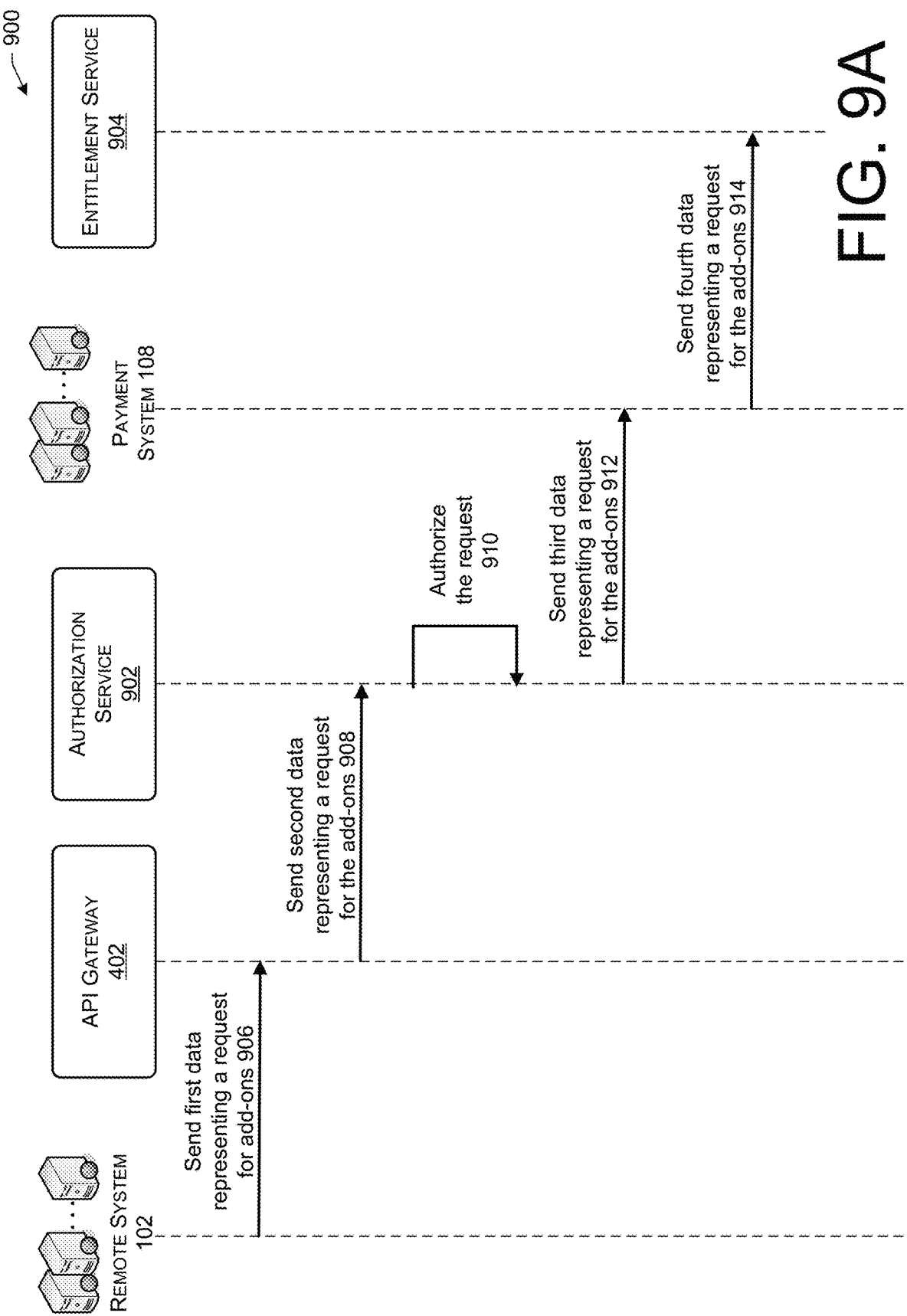

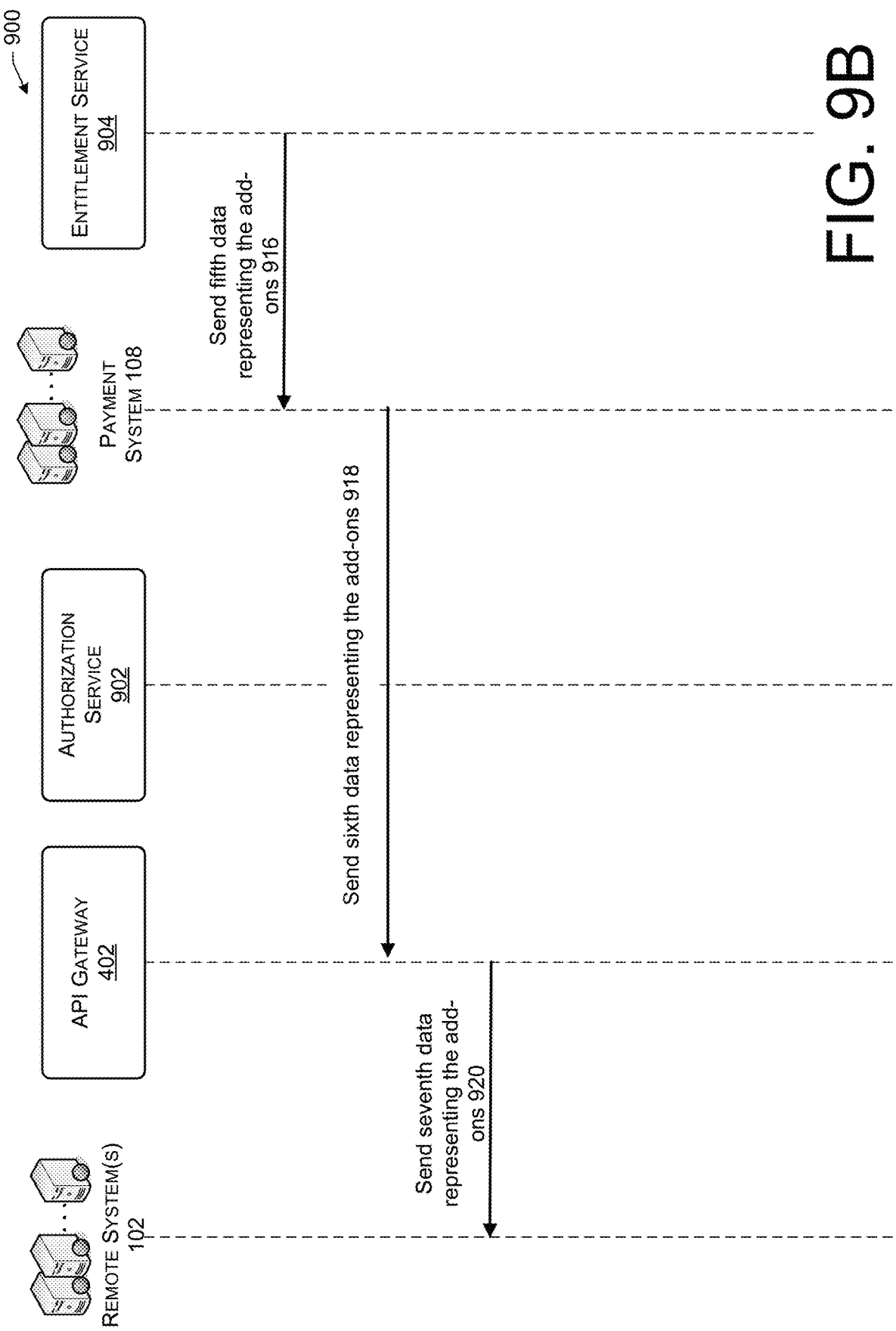

PROVIDING ADD-ONS FOR NETWORK APPLICATIONS

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller in possession of a user. The video game console may then process the inputs in order to update the state of the game. Based on the updates, the video game console may cause the television to display content related to the updated state of the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 7A-7C illustrate a diagram representing a process for acquiring an add-on associated with an application, in accordance with examples of the present disclosure.

FIGS. 8A-8B illustrate a diagram representing a process for processing a transaction for an add-on associated with an application, in accordance with examples of the present disclosure.

FIGS. 9A-9B illustrate a diagram representing a process for identifying add-ons that are associated with a user account, in accordance with examples of the present disclosure.

DETAILED DESCRIPTION

Figure 1:
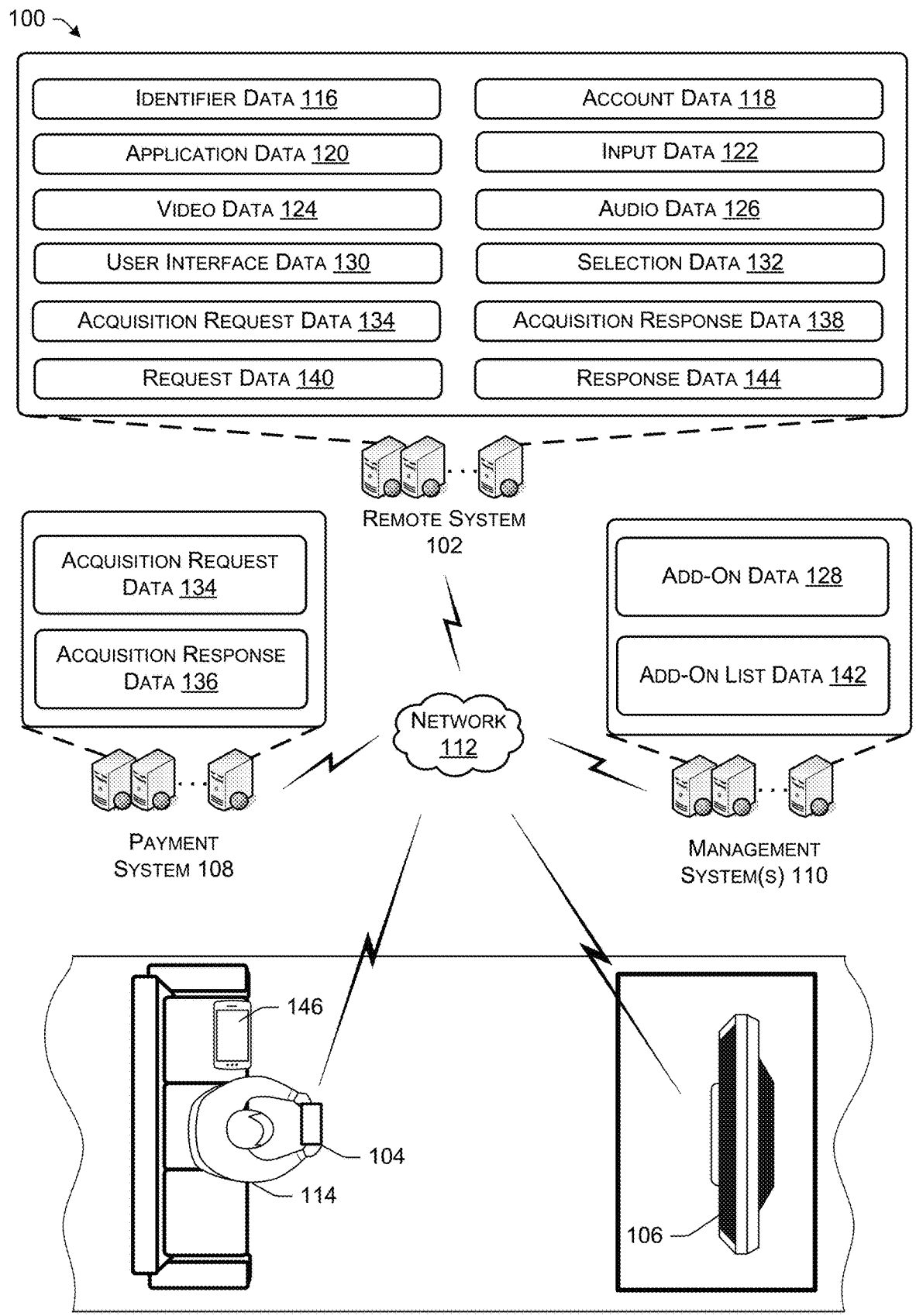
FIG. 1 illustrates a schematic diagram of an example system for providing add-ons associated with a network application, in accordance with examples of the present disclosure.

This disclosure describes, in part, systems and techniques for providing add-ons associated with network applications. For instance, a user may control an application executing on a remote system using a control device that communicates with the remote system via a network connection. For instance, the control device may send data to the remote system, where the data represents at least inputs received by the control device. The remote system may then update a current state of the application using the data received from the control device. Additionally, the remote system may send, via the network connection, video data to a display device, where the video data represents the current state of the application. As such, and in some instances, an additional electronic device, such as a video game console, may not be required to execute the network application and/or process the data from the control device. In such examples, this may remove the need of the additional electronic device.

In some instances, the remote system may provide the user with add-ons that the user can acquire (e.g., purchase, rent, etc.) for the application. For instance, the remote system may send, via the network connection, user interface data representing a user interface that includes the add-ons and/or prices associated with acquiring the add-ons. The user may then use the control device to select an add-on for acquisition. Based at least in part on the selection, the display device may send data representing the selection of the add-on to a payment system for processing a transaction for the price of the add-on. After the transaction is complete, the remote system may enable the add-on for the user. For instance, the remote system may send, via the network connection, video data to the display device, where the video data represents an updated state of the application that includes content related to the add-on.

For more detail, the user may initially configure the control device. The control device may include, but is not limited to, a video game controller, a keyboard, a mouse, a tablet, a mobile phone, a computer, a camera, a microphone, and/or any other type of device that is capable of receiving input from the user and/or capable to generating data. To configure the control device, the user may input configuration settings into the control device and/or another device. If the configuration settings are input into another device, the other device may then send data representing the configuration settings to the control device. The configuration settings may include, but are not limited to, an identifier associated with a network device (e.g., a service set identifier (SSID) associated with a router), a password, and/or the like. The control device may then store data representing the configuration settings. Additionally, the control device may use the configuration settings to connect to the network in order to communicate with the remote system.

In some instances, the user may further configure the control device with the remote system. For instance, the remote system may receive, from the control device and/or another device, data representing an identifier of the control device. As described herein, an identifier of a device may include, but is not limited to, an Internet Protocol (IP) address, a media access control (MAC) address, a numerical identifier, an alphabetic identifier, a mixed numerical and alphabetic identifier, and/or any other type of identifier that may be used to identify the device. The remote system may then store the data representing the identifier of the control device in a user account associated with the user. In some instances, if the remote system is not already storing the user account, the remote system may initially generate the user account before storing the data representing the identifier in the user account.

As described herein, the user account may be associated with an account name, an account password, payment information associated with a payment instrument (e.g., a credit card number, a debit card number, etc.), one or more applications (e.g., one or more applications acquired by a user), one or more add-ons (e.g., one or more add-ons acquired by the user), one or more account profiles, and/or other information. In some instances, the user may have one user profile while in other instances, the user may have multiple user profiles. For example, the user may have a user profile associated with a first gaming application, a second user profile associated with a second gaming application, and/or the like. In some instances, each of these user profiles is associated with the user account.

In some instances, the user may further configure one or more display devices with the remote system. A display device may include, but is not limited to, a television, a projector, a monitor, a tablet, a mobile phone, a peripheral device that connects to another display device, and/or any other type of device that is capable to displaying content (e.g., image(s), videos, etc.) and/or capable of causing another device to display content. To configure a display device, the remote system may receive, from the display device and/or another device, data representing an identifier of the display device. The remote system may then store the data representing the identifier of the display device in the user account.

In some instances, the remote system may further store data representing one or more applications that are accessible by the control device via the network. An application can include, but is not limited to, a gaming application, a word processing application, an educational application, a multimedia application (e.g., movie, music, etc.), and/or any other type of application that is capable of being accessed via the network. The remote system may associate one or more of the applications with the user account. For instance, the remote system may receive data indicating that the user has acquired (e.g., purchased, rented, etc.) an application from the remote system. In some instances, the remote system may then store, in the user account, data indicating that the user acquired the application.

To access an application, the control device may connect to the network using the configuration settings. The control device may then send, to the remote system, data representing at least the identifier associated with the control device. The remote system may receive the data and determine, using the user account, that the data is received from the control device. The remote system may further determine, using the user account, that the control device is associated with at least the display device. In some instances, the remote system may then establish a network connection with the display device. In some examples, the network connection may include a streaming instance (e.g., a game streaming instance). In other examples, the network connection may include any other type of connection between the remote system and the display device.

In some instances, the remote system may then send, to the display device, data (e.g., video data, audio data, etc.) representing the one or more applications acquired by the user. In some instances, the remote system may send, to the display device, data (e.g., video data, audio data, etc.) representing one or more additional applications that are accessible for the user. In either example, the display device may receive the data and display content that identifies the one or more applications. For instance, the content may include a respective identifier (e.g., a name) of each of the one or more applications that are accessible to the user.

The remote system may then receive, from the control device, data (e.g., input data) representing a selection of an application. Based at least in part on the data, the remote system may begin executing data (e.g., computer code) representing the application. The remote system may then begin receiving data representing inputs received by the control device. In some instances, the remote system receives the data each time the control device receives an input. In some instances, the remote system receives the data at given time intervals (e.g., every millisecond, ten milliseconds, second, etc.). In either instance, the remote system uses the data to update the state of the application based at least in part on the input(s) being received by the control device. The remote system may then send data representing the states of the application to the display device.

For instance, the remote system may send, to the display device, data (e.g., video data, audio data, etc.) representing a first state of the application. For example, if the application includes a gaming application, the first state of the application may include an object (e.g., a character) located at a first position within a gaming environment (e.g., a forest). The display device may receive the data from the remote system. Using the data, the display device may display image(s) representing the first state of the application. For example, and again if the application includes the gaming application, the display device may display content representing the object located at the first position within the gaming environment. In some instances, the display device may further output sound represented by the audio data. The user may then use the control device to provide inputs to the application via the remote system.

For instance, the control device may receive an input, such as a selection of a button, joystick, key, touch-sensitive pad, sensor, and/or the like associated with the control device. The control device may then send, to the remote system, data representing the input. Using the data, the remote system may update the first state of the application to a second state of the application. For example, and again if the application includes the gaming application, the input may be associated with moving the object forward by a given amount within the gaming environment. As such, the remote system may update the first state of the application to the second state of the application by moving the object forward in the environment by the given amount. The remote system may then send, to the display device, data (e.g., video data, audio data, etc.) representing the second state of the application. The display device may display image(s) representing the second state of the game. For example, the display device may display content representing the object located at the second position within the gaming environment. Additionally, in some instances, the display device may further output sound represented by the audio data. The remote system may then continue to perform similar processes to update the state of the application on the display device as the remote system continues to receive data from the control device.

In some instances, the remote system may further send data (e.g., video data, audio data, etc.) to the control device, where the data is associated with the state of the application being displayed by the display device. For example, the remote system may send, to the control device, audio data that represents sound corresponding to a current state of the application being displayed by the display device. The control device may receive the audio data from the remote system and, in response, output the sound. In some instances, when sending audio data to the control device, the remote system, the control device, and/or another device may synchronize the output of the audio data with the current state of the application.

In some instances, the remote system may provide the user with add-ons that the user can acquire for the application. As described herein, add-ons may include, but are not limited to, items, currency, perks, abilities, and/or other types of entitlements that may be acquired for an application. In some instances, the remote system may provide various types of add-ons for acquisition. The types of add-ons may include, but are not limited to, consumable add-ons, durable add-ons, subscription add-ons, and/or the like.

A consumable add-on may include an add-on that is consumed, used, and/or expired while controlling the application. As such, the user may be able to acquire the consumable add-on multiple times while controlling the application. A durable add-on may include an add-on that lasts for the duration or lifetime of the application. As such, the user may acquire the consumable add-on once, but use the consumable add-on whenever the user controls the application. Finally, a subscription add-on may include an add-on with a subscription that causes reoccurring acquisitions of the add-on. For instance, the subscription add-on may automatically be acquired at the elapse of a given time period (e.g., each day, week, month, year, etc.), whenever the user begins controlling the application, during a new session associated with the application, and/or the like.

In some instances, the remote system receives, from another remote system (referred to, in some examples, as a "management system"), data representing the add-ons that are available for the application. The management system may be associated with a publisher, manufacturer, owner, and/or the like of the application. In some instances, the remote system may receive the data at given time periods. For instance, the remote system may receive the data every day, week, month, year, and/or the like. In some instances, the remote system may receive the data whenever the management system add, deletes, and/or updates one or more add-on associated with the application. Still, in some instances, the remote system may receive the data in response to sending, to the management system, a request for the add-ons that are available for the application. In such instances, the remote system may send the request when the user begins controlling the application.

The remote system may then send, to the display device, user interface data representing a user interface that includes a marketplace, where the marketplace includes the add-ons that are available for the application, the prices associated with the add-ons, information (e.g., the types, etc.) associated with the add-ons, and/or the like. The display device may then provide the marketplace to the user, which the user may use to search through and select at least an add-on for acquisition. For example, the display device may initially display add-ons that are available for acquisition. While displaying the add-ons, the remote system may receive, from the control device, input data representing an input associated with viewing additional add-ons for the application. In response, the remote system may send, to the display device, additional data representing the additional-add-ons, which the display device may display to the user. The remote system may then receive, from the control device, input data representing an input selecting an add-on from the additional add-ons. In response, the remote system may send, to the display device, data indicating that the add-on was selected.

In some instances, in response to selection of an add-on, the display device may initiate the acquisition of the add-on. For example, the display device may send, to another remote system (referred to, in some examples, as a "payment system"), data representing at least an identifier of the user account, an identifier of the add-on, the price of the add-on, and/or the like. The payment system may then use the user account (e.g., payment information stored in association with the user account) to process a transaction for the price of the add-on. After processing the transaction, the payment system may send, to the management system, data indicating that the add-on has been acquired. Additionally, the payment system may send, to the display device, data indicating the add-on has been acquired. In some instances, the display device may then send the data indicating that the acquisition was complete to the remote system.

The remote system may then cause the add-on to be available for the user. In some instances, before causing the add-on to be available, the remote system may first send, to the management system and/or the payment system, data representing a request for add-ons associated with the user account. The remote system may then receive, from the management system and/or the payment system, data indicating that the add-on is available for the application.

In some instances, the remote system may already store data representing the add-on. For example, and as discussed above, the remote system executes the data representing the application, where the application may already include the add-on. As such, to make the add-on available to the user, the remote system may send, to the display device, video data that represents a state of the application, where the state of the application includes content related to the add-on. In other instances, the remote system may receive the data representing the add-on from another system, such as the management system. The remote system may then use the received data to make the add-on available to the user.

In some instances, the processes described above may be referred to as an "in-application" acquisitions of the add-on. More specifically, an "in-application" acquisition may include an acquisition that occurs while the remote system has the network connection established with the display device and/or while the remote system is executing the data representing the application for the user. However, in other instances, the user may be able to acquire add-ons using another process, which may be referred to as "out-of-application" acquisitions. More specifically, an "out-of-application" acquisition may include an acquisition that occurs when the remote system does not have an established network connection with the display device.

For example, the remote system may allow the user to acquire add-ons using other types of devices. For instance, the remote system may send, to an electronic device (e.g., a mobile phone, a computer, a tablet, etc.) data representing at least the add-ons that are available. The remote system may then receive, from the electronic device, input data representing a selection of an add-on. In response, the remote system may send, to the display device, data that causes the display device to initiate the acquisition of the add-on for the user. For instance, the data may cause the display device to communicate with the payment system, similar the examples above, to acquire the add-on. After acquiring the add-on, the display device may send, to the remote system, data indicating that the add-on has been acquired.

In some instances, the remote system may determine which add-ons the user has acquired for the application when the user begins controlling the application. For instance, the remote system may receive, from the control device and/or another device, data representing the identifier associated with the control device and/or input data representing a selection of the application. Based at least in part on the data, the remote system may establish a new network connection with the display device. The remote system may then send, to the management system and/or the payment system, data representing a request for the add-ons associated with the user account. In some instances, the data may include, but is not limited to, data representing the identifier associated with the user account, data representing the identifier of the application, data representing a request for the add-ons, and/or the like. In response, the remote system may receive, from the management system and/or the payment system, data indicating the add-ons that are available. Based at least in part on the data, the remote system may provide the add-ons to the user when the user is controlling the application.

In some instances, the remote system may provide updates associated with the add-ons to the management system and/or the payment system. For instance, if a consumable add-on is consumed, used, and/or expired during a session of the application, then the remote system may send, to the management system and/or the payment system, data indicating that the add-on is consumed, used, and/or expired. As such, the management system and/or the payment system may no longer associate the add-on with the user account. For another example, if a subscription add-on is canceled, then the remote system may send, to the management system and/or the payment system, data indicating that the add-on was canceled. As such, the management system and/or the payment system may no longer associate the add-on with the user account.

In some instances, the payment system may be associated with the remote system, but the management system may include a third-party system that is separate from both the payment system and the management system. The systems may then work together to manage the add-ons for various applications. For example, and in some instances, the remote system may manage add-ons by having the payment system store data associating the add-ons with user accounts. In such instances, the remote system may determine which add-ons are associated with user accounts by sending requests to the payment system. In other instances, the management system may manage the add-ons by storing data associating the add-ons with user accounts. In such instances, the remote system may determine which add-ons are associated with user accounts by sending the requests to the management system.

In some instances, such as when the application includes a gaming application, the remote system may perform similar processes and/or techniques as a video game console, a computing device, a tablet, and/or other electronic device to process the inputs received by the control device. However, unlike a traditional video game console, computing device, table, and/or other electronic device that is executing a gaming application, the remote system may be remote from the control device and/or the display device. For instance, the control device and/or the display device may be located in a user's environment, such as the user's home, apartment, office, and/or the like. The remote system may be remote from the user's environment and communicate with each of the control device and the display device via the network.

In the above examples, the remote system may be located remotely from the control device and the display device. For example, the control device and the display device may be located in an environment, such as a user's home, apartment, business, and/or the like. The remote system may then be located remotely from the environment, such as a cloud-based system. In other instances, the remote system may be located in the same environment as the control device and/or the display device. For instance, the remote system may include a device that is located within the environment.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an example system 100 for providing add-ons associated with a network application, in accordance with examples of the present disclosure. The system 100 may include, for example, a remote system 102, a control device 104, a display device 106, a payment system 108, and management system(s) 110. In the example of FIG. 1, the control device 104 may communicate with the remote system 102 over network(s) 112, such as by using a first communication channel. Additionally, the display device 106 may communicate with the remote system 102 over the network(s) 112, such as by using a second communication channel. By sending and receiving data with the control device 104 and the display device 106, the remote system 102 allows the user 114 to control, via the remote system 102, the application being displayed by the display device 106 and/or another device connected to the display device 106 using the control device 104.

For instance, the remote system 102 may receive, from the control device 104 and/or another device, identifier data 116 representing at least an identifier of the control device 104, an identifier of a user account associated with the user 114 and/or the control device 104, and/or the like. As described herein, an identifier may include, but is not limited to, an Internet Protocol (IP) address, a media access control (MAC) address, a numerical identifier, an alphabetic identifier, a mixed numerical and alphabetic identifier, and/or any other type of identifier that may be used to identify a device, a user account, a user, and/or the like. The remote system 102 may then use profile data 118, which represents the user account, to determine that the identifier data 116 was received from the control device 104. For instance, the remote system 102 may determine that an identifier represented by the identifier data 116 corresponds (e.g., matches) with an identifier represented by the profile data 118. Based at least in part on the determination, the remote system 102 may establish the first network connection with the control device 104.

Additionally, the remote system 102 may use the profile data 118 to determine that the display device 106 is associated with the control device 104. In some instances, the remote system 102 makes the determination based at least in part on determining that the profile data 118 represents an identifier associated with the display device 106. Based at least in part on the determination, the remote system 102 may establish the second communication channel with the display device 106. In some instances, the second communication channel may be associated with a streamlining instance. This way, the remote system 102 may be able to send data to and/or receive data from the display device 106.

In some instances, the remote system 102 may store application data 120 representing one or more applications that are accessible by the control device 104 via the network(s) 112. An application can include, but is not limited to, a gaming application, a word processing application, an educational application, a multimedia application (e.g., movie, music, etc.), and/or any other type of application that is capable of being accessed via the network(s) 112. In some instances, the remote system 102 may associate one or more of the applications with the profile data 118. For instance, the remote system 102 may receive data indicating that the user 114 has acquired (e.g., purchased, rented, etc.) an application from the remote system 102. In some instances, the remote system 102 may then update the profile data 118 to indicate that the user 114 has acquired the application. The remote system 102 may then allow the user 114 to access the application using the control device 104.

To access an application, the remote system 102 may send, to the display device 106, data (e.g., video data, audio data, etc.) representing one or more applications that are available to the user 114. In some instances, the one or more applications may include one or more applications that have been acquired by the user 114 (e.g., the one or more applications that are associated with the profile data 118). Additionally, or alternatively, in some instances, the one or more applications may include one or more applications that are free to users. In either example, the display device 106 may receive the data from the remote system 102. The display device 106 may then display image(s) that represent the one or more applications that are available to the user 114. For example, the image(s) may include one or more identifiers (e.g., one or more names) of the one or more applications that are available to the user 114.

The remote system 102 may then receive, from the control device 104, input data 122 representing input(s) received by the control device 104. The remote system 102 may analyze the input data 122 to identify an application that is selected by the user 114. For example, the input(s) may correspond to movement(s) of an object, such as a cursor, across the image(s) representing the one or more applications. The input(s) may further correspond to a selection of one of the applications (e.g., a selection of a control on the control device 104 when the object is located over the selected application). The remote system 102 may then determine, based at least in part on the selection, that the user 114 selected the application.

The remote system 102 may then send, to the display device 106, data representing a first state of the application. The data may include first video data 124 representing image(s) of the first state of the application, first audio data 126 representing sound corresponding to the first state of the application, timestamp data representing a time for displaying the first state of the application and/or a time for outputting the sound, and/or the like. In some instances, the remote system 102 sends a first data packet that includes the first video data 124, the first audio data 126, and/or the timestamp data. In other instances, the remote system 102 may separately send the first video data 124, the first audio data 126, and/or the timestamp data to the display device 106.

The display device 106 may receive the data (and/or the first data packet) from the remote system 102. Using the first video data 124, the display device 106 may display image(s) representing the first state of the application. For example, if the application includes a gaming application, the display device 106 may display content representing a first state of the game. In the example of FIG. 1, the first state of the game may include an object (e.g., a character) located at a first position in a gaming environment (e.g., a forest). In some instances, the display device 106 may further output the sound represented by the first audio data 126. In some instances, the display device 106 displays the image(s) and/or outputs the sound according to the time(s) represented by the timestamp data.

In some instances, the remote system 102 may additionally send, to the control device 104, data representing the first state of the application. The data may include second audio data 126 representing sound corresponding to the first state of the application and/or timestamp data representing a time for outputting the sound. In some instances, the remote system 102 sends a second data packet that includes the second audio data 126 and/or the timestamp data. In other instances, the remote system 102 may send the second audio data 126 separately form the timestamp data. The control device 104 may then output the sound represented by the second audio data 126. In some instances, the control device 104 may output the sound according to the time represented by the timestamp data. In some instances, timestamp data sent to the display device 106 and/or the timestamp data sent to the control device 104 synchronizes the outputting of the sound by the control device 104 with the displaying of the image(s) by the display device 106.

The user 114 can then use the control device 104 to provide inputs to the application. For instance, the control device 104 may receive an input, such as a selection of a button, joystick, key, touch-sensitive pad, sensor, and/or the like associated with the control device 104. The control device 104 may then send, to the remote system 102, input data 122 representing the input. Using the input data 122, the remote system 102 may update the first state of the application to a second state of the application. For example, and using the example above where the application includes the gaming application, the input may be associated with moving the object forward by a given amount within the gaming environment. As such, the remote system 102 may analyze the input data 122 to determine that the input includes moving the object forward by the given amount. The remote system 102 may then update the first state of the of the application to the second state of the application by moving the object forward in the environment by the given amount.

The remote system 102 may then send data representing a second state of the application to the display device 106. The data may include third video data 124 representing image(s) of the second state of the application, third audio data 126 representing sound corresponding to the second state of the application, timestamp data representing a time for displaying the second state of the application and/or a time for outputting the sound, and/or the like. In some instances, the remote system 102 sends a third data packet that includes the third video data 124, the third audio data 126, and/or the timestamp data. In other instances, the remote system 102 may separately send the third video data 124, the third audio data 126, and/or the timestamp data to the display device 106.

The display device 106 may receive the data (and/or the third data packet) from the remote system 102. Using the third video data 124, the display device 106 may display image(s) representing the second state of the application. For example, and again using the example where the application includes the gaming application, the display device 106 may display the object located at the second position within the gaming environment. In some instances, the display device 106 may further output the sound represented by the third audio data 126. In some instances, the display device 106 displays the image(s) and/or outputs the sound according to the time(s) represented by the timestamp data.

In some instances, the remote system 102 may additionally send, to the control device 104, data representing the second state of the application. The data may include fourth audio data 126 representing sound corresponding to the second state of the application and/or timestamp data representing a time for outputting the sound. In some instances, the remote system 102 sends a fourth data packet that includes the fourth audio data 126 and/or the timestamp data. In other instances, the remote system 102 sends the fourth audio data 126 separately from the timestamp data. In either instance, the control device 104 may then output the sound represented by the fourth audio data 126. In some instances, the control device 104 may output the sound according to the time represented by the timestamp data. In some instances, timestamp data sent to the display device 106 and/or the timestamp data sent to the control device 104 synchronizes the outputting of the sound by the control device 104 with the displaying of the image(s) by the display device 106.

In some instances, the remote system 102 may continue to receive input data 122 from the control device 104. The remote system 102 may then continue to process the input data 122 in order to update the state of the application. Based at least in part on the updating, the remote system 102 may continue to send, to the display device 106, data (e.g., video data 124, audio data 126, timestamp data, etc.) representing the current state of the application. In some instances, the remote system 102 sends the data to the display device 106 as a data packet. The remote system 102 may further send, to the control device 104, data (e.g., audio data 126, timestamp data, etc.) representing the current state of the application. In some instances, the remote system 102 sends the data to the control device 104 as part of a data packet.

In the example of FIG. 1, the remote system 102 may further receive, from the management system(s) 110, add-on data 128 representing add-ons that are available for the application. In some instances, the remote system 102 may then store the add-on data 128 in association with the application data 120 representing the application. Additionally, the remote system 102 may generate an online marketplace that the user 114 may use to acquire one or more of the add-ons. For example, the online marketplace may include identifiers and/or graphical elements representing the add-ons, prices associated with the add-ons, information associated with the add-ons, and/or the like. The remote system 102 may then send, to the display device 106, user interface data 130 representing a user interface that includes at least a portion of the online marketplace.

The display device 106 may receive the user interface data 130 and, in response, display the user interface that includes the at least the portion of the marketplace. In some instances, while the display device 106 is displaying the at least the portion of the marketplace, the remote system 102 may receive, from the control device 104, input data 122 representing an input to view additional add-ons. In response, the remote system 102 may send, to the display device 106, additional user interface data 130 representing an additional portion of the online marketplace that includes the additional add-ons, which the display device 106 may display to the user 114. In some instances, while the display device 106 is displaying the at least the portion of the marketplace, the remote system 102 may receive, from the control device 104, input data 122 representing a selection of an add-on. In response, the remote system 102 may send, to the display device 106, selection data 132 indicating the selection of the add-on.

The display device 106 may receive the selection data 132 and initiate a transaction for the add-on. For example, the display device 106 may send, to the payment system 108, acquisition request data 134 representing an identifier of the user account, payment information associated with the user account, an identifier of the add-on, a price of the add-on, and/or the like. The payment system 108 may then use the acquisition request data 134 to process the transaction for the price of the add-on. After processing the transaction, the payment system 108 may send, to the display device 106, acquisition response data 136 indicating that the transaction is complete. Additionally, in some instances, the payment system 108 may send, to the management system(s) 110, acquisition response data 134 indicating that the transaction is complete. As described herein, acquisition response data may include, but is not limited to, data representing an identifier of the user account, data representing an identifier of the add-on, data representing the price of the add-on, data representing the transaction is complete, and/or the like.

In some instances, the display device 106 may then send, to the remote system 102, acquisition response data 138 indicating that the transaction was complete. Additionally, in some instances, to confirm that the transaction was complete, the remote system 102 may send, to the management system(s) 110, request data 140 representing a request for add-ons associated with the user account and/or the application. As described herein, the request data 140 may include, but is not limited to, data representing an identifier of the user account, data representing an identifier of the application, data representing the request, and/or the like. The management system(s) 110 may receive the request data 140 and then use the request data 140 to determine the add-ons.

For instance, the management system(s) 110 may store add-on list data 142 representing add-ons that have been acquired by the user 114. For example, the add-on list data 142 may associate an identifier associated with the user account and/or the user with identifiers of add-ons that have been acquired. In some instances, the management system(s) 110 update the add-on list data 128 using the acquisition response data 136 received from the payment system 108. For example, after receiving the acquisition response data 136, the management system(s) 110 may store add-on list data 142 that associates the acquired add-on with the user account, the user, and/or the application. This way, the management system(s) 110 are able to determine which add-ons have been acquired for the application.

After determining the add-ons, the management system(s) 110 may send, to the remote system 102, response data 144 representing the add-ons that have been acquired by the user 114 and/or for the application. The remote system 102 may then use the response data 144 to confirm that the user 114 acquired the add-on. Based at least in part on the determination, the remote system 102 may provide the add-on for the user 114. For example, the remote system 102 may send, to the display device 106, data (e.g., video data 124, audio data 126, etc.) representing a state of the application, where the state of the application includes content related to the add-on. For example, and using the example above where the application includes the gaming application, if the add-on includes an item, the video data 124 may represent the object in possession of the item.

Although the above example describes the user 114 as using the control device 104 and the display device 106 to acquire the add-on, in other examples, the user 114 may use a separate electronic device 146 to acquire the add-on. For example, the electronic device 146 may display the online marketplace to the user 114. In some instances, the electronic device 146 displays the online marketplace using user interface data 130 received from the remote system 102. While displaying the online marketplace, the electronic device 146 may receive an input selecting an add-on from the one or more add-ons. In response, the electronic device 146 may send, to the remote system 102, input data 122 representing the selection of the add-on. For example, the input data 122 may include, but is not limited to, data representing an identifier of the user account, data representing payment information associated with the user account, data representing an identifier of the application, data representing an identifier of the add-on, data representing a price of the add-on, and/or the like.

The remote system 102 may then send the acquisition request data 134 to the display device 106. Additionally, the display device 106 may initiate the transaction for the add-on, similar to the processes described above. The user 114 may then use the add-on the next time that the user 114 uses the control device 104 and/or the display device 106 to control the application.

For example, the next time that the user 114 uses the control device 104, such as to begin a new session with the application, the remote system 102 may receive the identifier data 116 and/or the selection data 132 representing the selection of the application. Based at least in part on the received data, the remote system 102 may establish a new communication channel with the display device 106. The remote system 102 may then send, to the management system(s) 110, request data 140 representing a request for add-ons associated with the user account and/or the application. The management system(s) 110 may then use the add-on list data 142 to determine that the user 114 acquired the add-on. Based at least in part on the determination, the management system(s) 110 may send, to the remote system 102, the response data 144 representing that the add-on has been acquired by the user 114.

In the example above, where the remote system 102 communicates with the management system(s) 110 to determine the acquired add-ons, the management system(s) 110 may manage the add-ons for the application. However, in other examples, the payment system 108 may manage the add-ons for the application. In such examples, the payment system 108 may store the add-on list data 142. Additionally, the payment system 108 may receive the request data 140 from the remote system 102 and determine the add-ons using the add-on list data 142. After the determination the payment system 108 may send the response data 144 back to the remote system 102.

In the example of FIG. 1, there may be more than one management system 110. In some instances, different management systems 110 may manage different applications represented by the application data 120.

Figure 2:
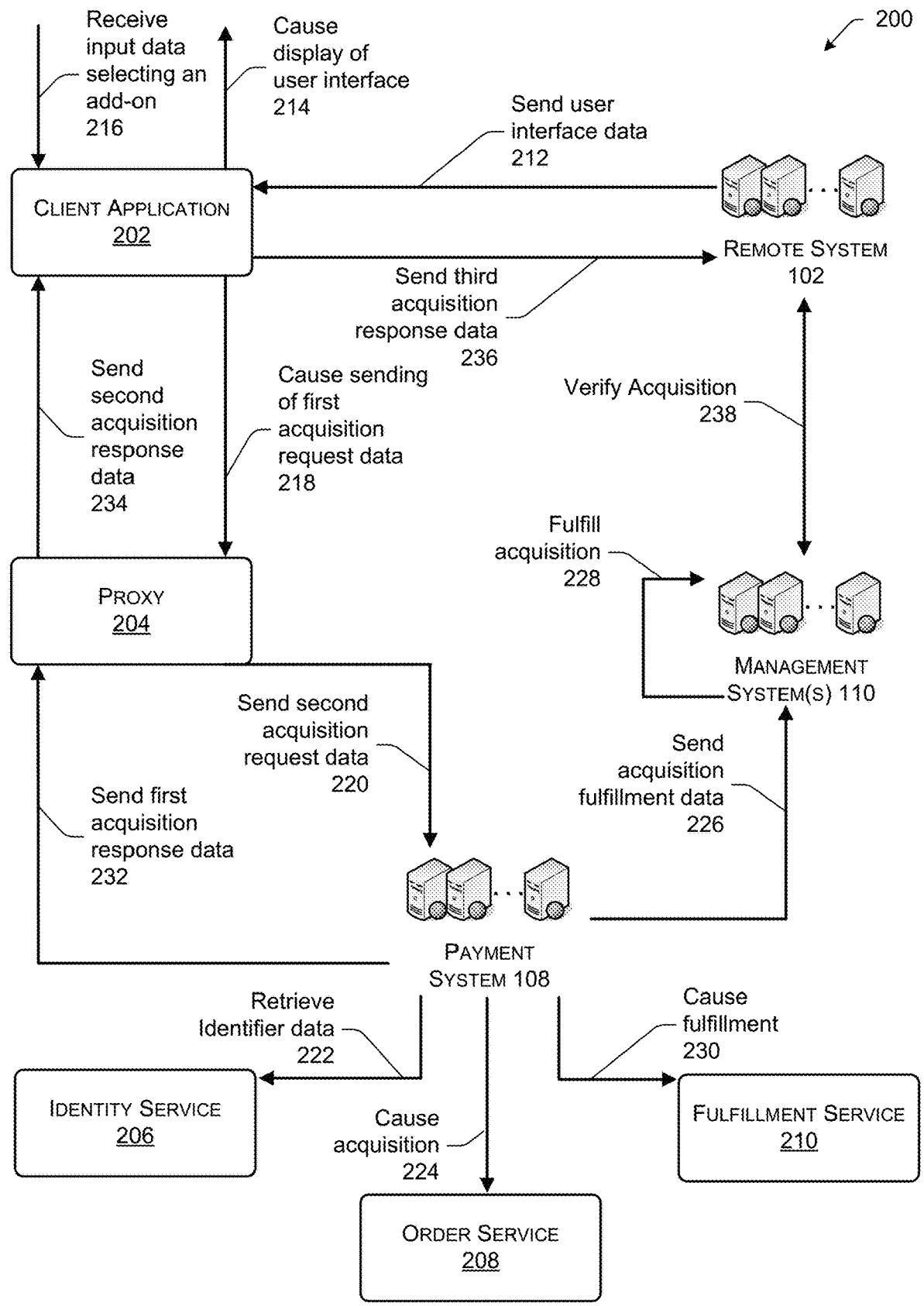
FIG. 2 illustrates a diagram of an example system for acquiring in-application add-ons, in accordance with various examples of the present disclosure.

FIG. 2 illustrates a diagram of an example system 200 for acquiring in-application add-ons, in accordance with various examples of the present disclosure. As shown, the system 200 includes the remote system 102, the payment system 108, and the management system(s) 110. The system 200 further includes a client application 202, a proxy 204, an identity service 206, an order service 208, and a fulfillment service 210. In some instances, the client application 202 may include an application executing on a device of the user 114, such as the display device 106. The client application 202 may be used by the display device 106 to communicate with the remote system 102 in order to control the applications executed by the remote system 102.

The proxy 204 may include an interface between the client application 202 and the payment system 108. For example, the proxy 204 may include one or more computing devices, application programming interfaces (APIs), and/or the like that send data between the client application 202 and the payment system 108. In some instances, one or more of the identity service 206, the order service 208, and/or the fulfillment service 210 may be included within the payment system 108. Additionally, or alternatively, in some instances, one or more of the identity service 206, the order service 208, and/or the fulfillment service 210 may be included on one or more separate computing devise.

At 212, the remote system 102 may send user interface data to the client application 202. For instance, the remote system 102 may send the user interface data 130 representing the user interface that includes the online marketplace. In the example of FIG. 2, the remote system 102 may send the user interface data 130 while executing the application data 120 representing the application. As such, the user 114 may be able to acquire add-ons for the application while controlling the application using the control device 104.

At 214, the client application 202 may cause displaying of the user interface and at 216, the client application 202 may receive input data selecting an add-on. For instance, the display device 106 may use the user interface data 130 to cause display of the user interface to the user 114. In some instances, when the display device 106 includes a display, causing the display may include displaying the user interface using the display. In other instances, when the display device 106 does not include a display, causing the display may include sending data to another device that causes the other device to display the user interface. While the user interface is being displayed, the user 114 may use the user interface to browse through and select the add-on for acquisition. As such, the display device 106 may receive input data 122, such as from the remote system 102, indicating the selection of the add-on.

At 218, the client application may cause sending of first acquisition request data to the proxy 204 and at 220, the proxy 204 may send second acquisition request data to the payment system 108. For instance, based at least in part on the selection of the add-on, the display device 106 may send the first acquisition request data 134 to the proxy 204, which may cause the proxy 204 to send the second acquisition request data 134 to the payment system 108. In some instances, the first acquisition request data 134 includes similar data as the second acquisition request data 134. In other instances, the first acquisition request data 134 includes different data as the second acquisition request data 134.

At 222, the payment system 108 may retrieve identifier data from the identity service 206 and at 224, the payment system 108 may cause acquisition of the add-on. For instance, based at least in part on receiving the second acquisition request data 134, the payment system 108 may retrieve the identity data from the identity service 206. In some instances, the identity data may include data representing the identity of the user 114, data representing the identity of the user account, payment information associated with the user account, and/or the like. The payment system 108 may then use the second request data 134 and/or the identifier data to cause the acquisition to be complete. For example, the payment system 108 may use the payment information to satisfy the price of the transaction.

At 226, the payment system 108 may send acquisition fulfillment data to the management system(s) 110 and at 228, the management system(s) 110 may fulfill the acquisition. For instance, after processing the transaction, the payment system 108 may send the acquisition fulfillment data to the management system(s) 110. In some instances, the acquisition fulfillment data may include, but is not limited to, data representing the identifier of the user 114, data representing the identifier of the user account, data representing the identifier of the application, data representing the identifier of the add-on, data representing that the transaction is complete, and/or the like. The management system(s) 110 may then use the fulfillment acquisition data to update the add-on list data 142. For instance, the management system(s) 110 may update the add-on list data 142 by storing data indicating that the add-on is available for the user account. In some instance, and at 230, the payment system 108 may then notify the fulfillment service 210 that the fulfillment is complete.

At 232, the payment system 108 may send first acquisition response data to the proxy 204 and at 234, the proxy 204 may send second acquisition response data to the client application 202. For instance, once the acquisition is complete, the payment system 108 may send the first acquisition response data 138 to the proxy 204, which may cause the proxy 204 to send the second acquisition response data 138 to the display device 106. In some instances, the first acquisition response data 138 may include the same data as the second acquisition response data 138. In other instances, the first acquisition response data 138 may include different data than the second acquisition response data 138.

In some instances, the display device 106 may then display content indicating that the acquisition is complete. Additionally, at 236, the client application 202 may cause sending of third acquisition response data to the remote system 102. For instance, the display device 106 may send the third acquisition response data 138 to the remote system 102. In some instances, and as shown in the example of FIG. 2, at 238, the remote system 102 may then verify the acquisition with the management system(s) 110. For example, the remote system 102 may send the request data 140 to the management system(s) 110 and, in response, receive the response data 144 from the management system(s) 110. The response data 144 may indicate that the add-on is associated with the user account.

Figure 3:
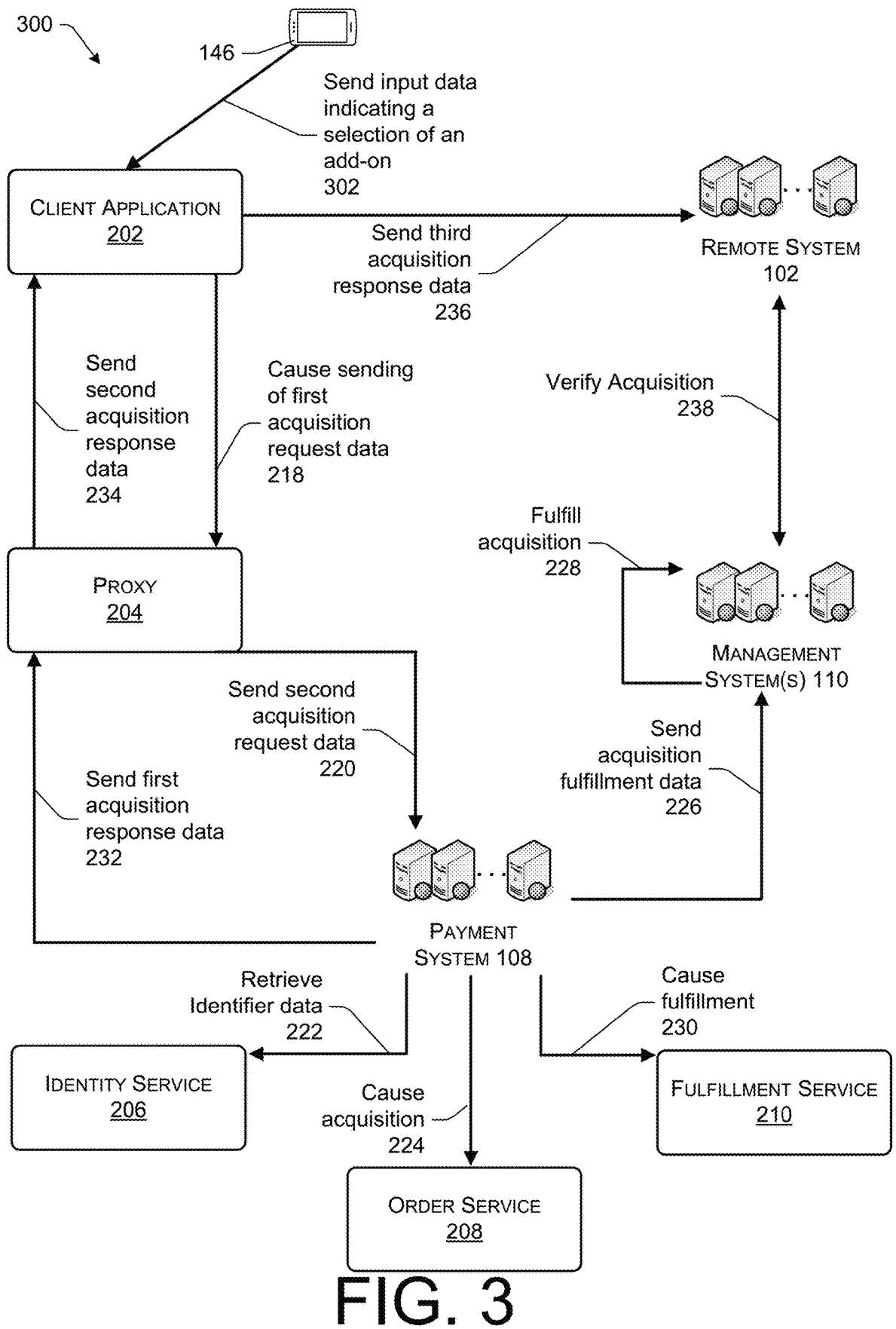
FIG. 3 illustrates a diagram of an example system for acquiring out-of-application add-ons, in accordance with various examples of the present disclosure.

FIG. 3 illustrates a diagram of an example system 300 for acquiring out-of-application add-ons, in accordance with various examples of the present disclosure. As shown, the difference between the example process 300 and the example process 200 is how the user 114 acquires the add-on. More specifically, in the example process 200, the user 114 acquires the add-on while the remote system 102 is executing the application data 120 representing in the application and/or while the remote system 102 has a network connection established with the display device 106. However, in the example process 300, the remote system 102 does not have a network connection established with the display device 106.

For example, at 302, the electronic device 146 may send, to the client application 202, input data indicating a selection of an add-on. For example, the electronic device 146 may allow the user 114 to browse through add-ons associated with the application, similar to the display device 106. While browsing, the electronic device 146 may receive an input selecting the add-on. Based at least in part on the input, the electronic device 146 may send the input data 122 to the client application 202 (which may be via one or more remote computing device). The input data 122 may include, but is not limited to, data representing an identifier associated with the user account, data representing an identifier of the application, data representing an identifier of the add-on, data representing a price of the add-on, data representing a request to acquire the add-on, and/or the like.

Figure 4:
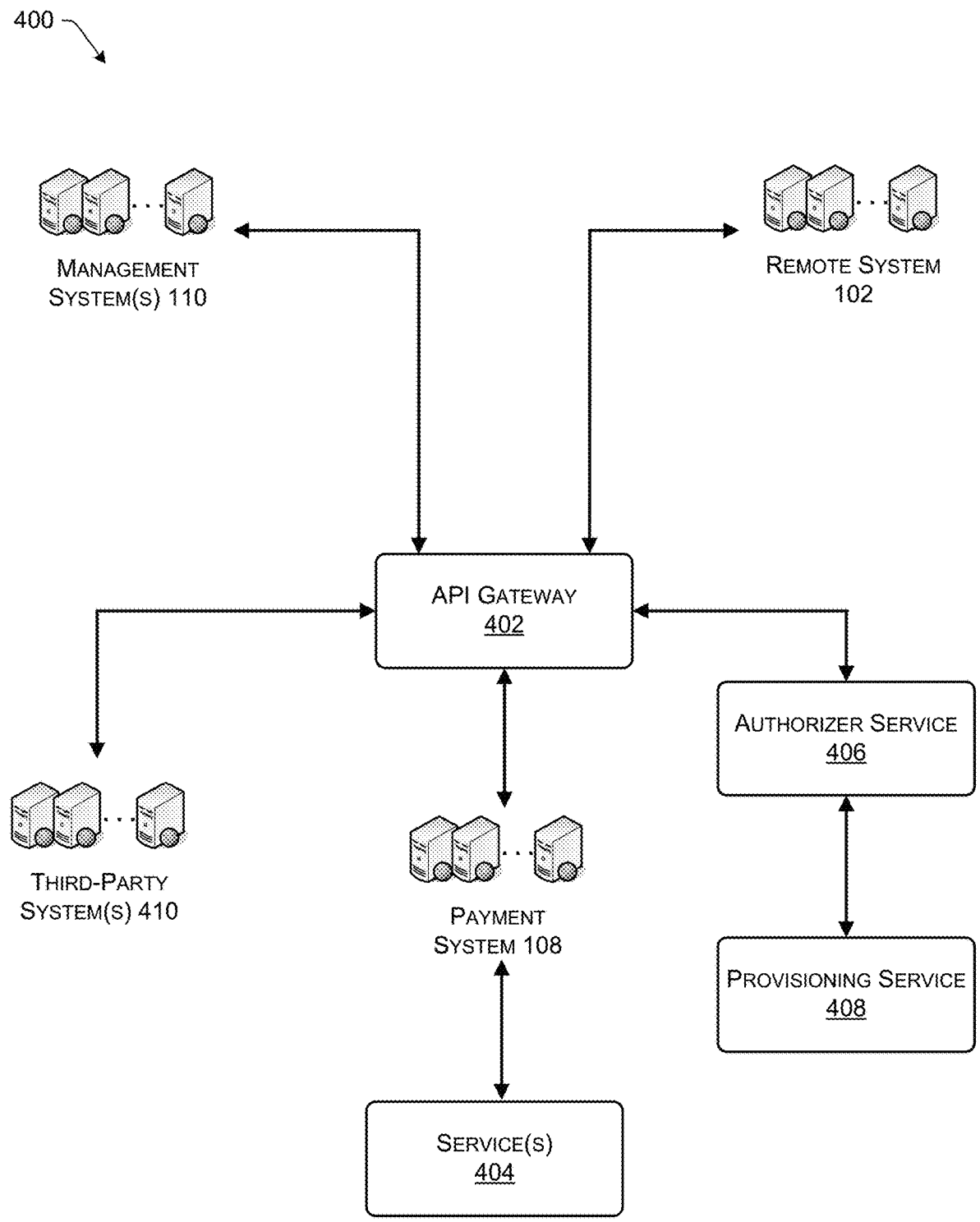
FIG. 4 illustrates a diagram of an example system for using an application programing interface (API) gateway to acquire and/or verify add-ons associated with network applications, in accordance with examples of the present disclosure.

FIG. 4 illustrates a diagram of an example system 400 for using an API gateway 402 to acquire and/or verify add-ons associated with network applications, in accordance with examples of the present disclosure. The system 400 may include the API gateway 402, service(s) 404, an authorization service 406, a provisioning service 408, and third-party system(s) 410. In some instances, one or more of the API gateway 402, the service(s) 404, the authorizer service 406, or the provisioning service 408 may be included in the payment system 108 and/or the remote system 102. In some instances, one or more of the API gateway 402, the service(s) 404, the authorizer service 406, or the provisioning service 408 may be executing on one or more other computing devices.

As shown, the remote system 102 and/or the management system(s) 110 may use the API gateway 402 to communicate with the payment system 402. In some instances, the API gateway 402 uses the authorizer service 406 (and/or the SIPS) to authorize the remote system 102 and/or the management system(s) 110. For instance, based at least in part on receiving data from the remote system 102 and/or the management system(s) 110, the API gateway 402 may use the authorizer service 406 to authorize that the remote system 102 and/or the management system(s) 110 are valid. Additionally, the API gateway 402 may use the establish one or more services associated with the network applications. For example, the API gateway 402 may use the provisioning service 408 to establish a game service for the user 114.

The API gateway 402 may then send the data to the payment system 108 (e.g., after verifying the remote system 102 and/or the management system(s) 110). The payment system 108 may then use the service(s) 404 to process transactions associated with add-ons and/or determine which add-ons are associated with user accounts. In some instances, the service(s) 404 may include, but are not limited to, the identity service 206, the order service 208, and/or the fulfillment service 210.

As further illustrated in the example of FIG. 4, the third-party system(s) 410 may further communicate with the remote system 102, the payment system 108, and/or the management system(s) 110 using the API gateway 402. For instance, the third-party system(s) 410 may use the API gateway 402 to notify the remote system 102, the payment system 108, and/or the management system(s) 110 about add-ons associated with user accounts.

Figure 5:
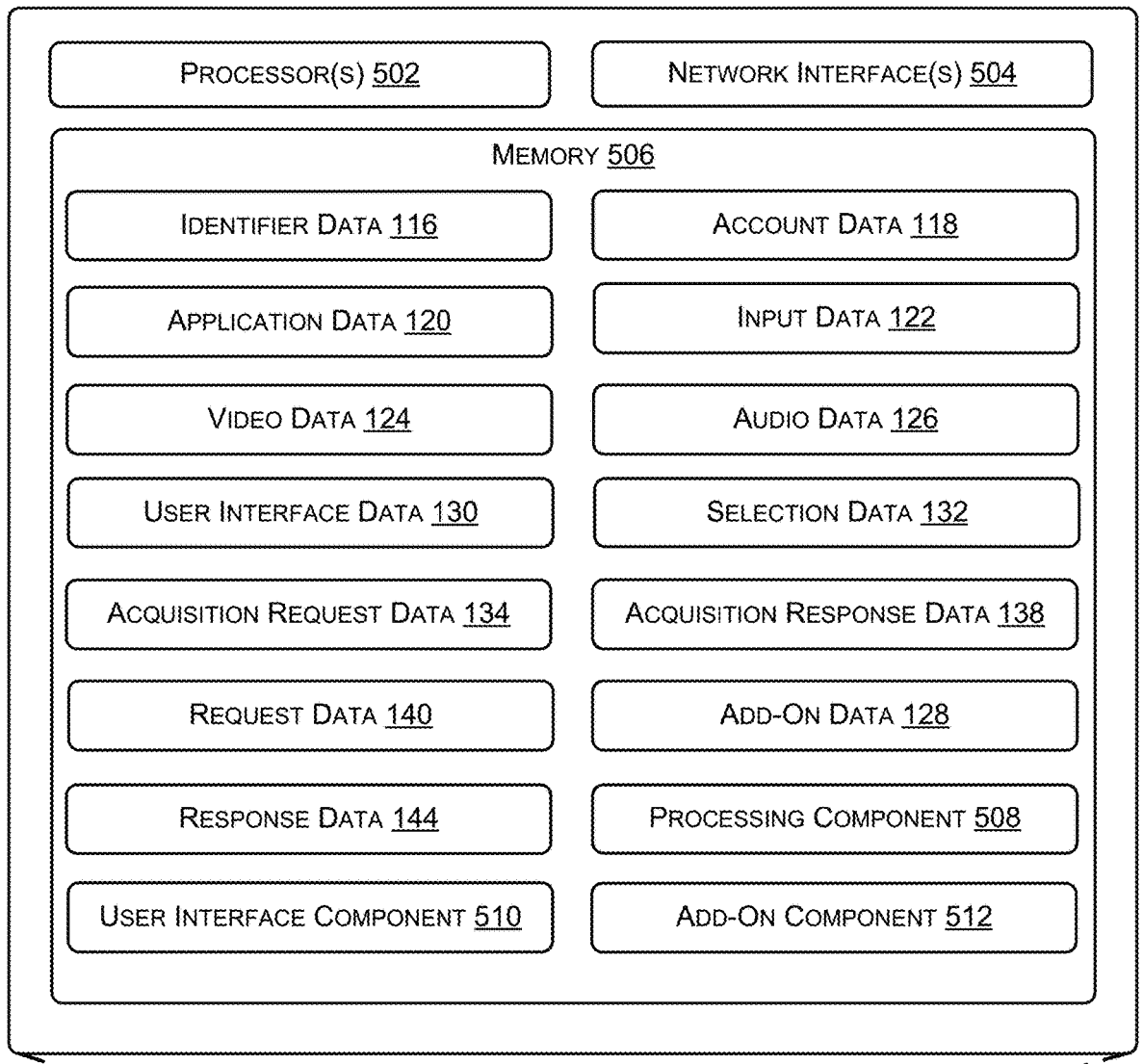
FIG. 5 illustrates a block diagram of an example architecture of a remote system configured to provide add-ons associated with network applications, in accordance with examples of the present disclosure.

FIG. 5 illustrates a block diagram of an example architecture of the remote system 102 that is configured to provide add-ons associated with network applications, in accordance with examples of the present disclosure. As shown, the remote system 102 includes processor(s) 502, network interface(s) 504, and memory 506. The memory 506 may store at least a processing component 508, a user interface component 510, and an add-on component 512.

The processing component 508 may be configured to update the state of the application and cause data representing the state of the application to be sent to the control device 104 and/or the display device 106. For example, based at least in part on the remote system 102 receiving the input data 122, the processing component 508 may analyze the input data 122 in order to determine one or more inputs received by the control device 104. The processing component 508 may then update the state of the application based at least in part on the one or more updates. Additionally, after updating the state of the application, the processing component 508 may cause the remote system 102 to send, to the control device 104 and/or the display device 106, data (e.g., video data 124, audio data 126, timestamp data, etc.) representing the current state of the application.

The user interface component 510 may be configured to use the add-on data 128 to generate the user interface representing the online marketplace for acquiring add-ons. As discussed herein, the user interface may include identifiers representing the add-ons that are available for the application, prices associated with the add-ons, information (e.g., the types, etc.) associated with the add-ons, and/or the like. In some instances, the user interface component 510 updates the user interface when the remote system 102 receives updated add-on data 128 from the management system(s) 110.

The add-on component 512 may be configured to enable add-ons for the applications. In some instances, the add-on component 512 communicates with the management system(s) 110 and/or the payment system 108 to determine which add-ons to enable. The add-on component 512 may further be configured to update the states of the add-ons as the add-ons are being utilized. For example, if an add-on includes a consumable add-on, the add-on component 512 may determine when the add-on expires and send, to the management system(s) 110, data indicating that the add-on has expired. The management system(s) 110 may then use the data to update the add-on list data 142 that the management system(s) 110 use to manage the add-ons.

As used herein, a processor, such as the processor(s) 502, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Additionally, memory, such as the memory 506, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 504, may enable messages between devices, such as the remote system 102, the control device 104, the display device 106, the payment system 108, the management system(s) 110, and/or with one or more other remote systems, as well as other networked devices. The network interface(s) may include one or more network interface controllers (NICs) or other types of transceiver devices to send and receive messages over the network(s) 112. For instance, each of the network interface(s) may include a personal area network (PAN) component to enable messages over one or more short-range wireless message channels. For instance, the PAN component may enable messages compliant with at least one of the following standards IEEE 802.14.4 (ZigBee), IEEE 802.14.1 (Bluetooth), IEEE 802.11 (WiFi), or any other PAN message protocol. Furthermore, each of the network interface(s) may include a wide area network (WAN) component to enable message over a wide area network.

Figure 6:
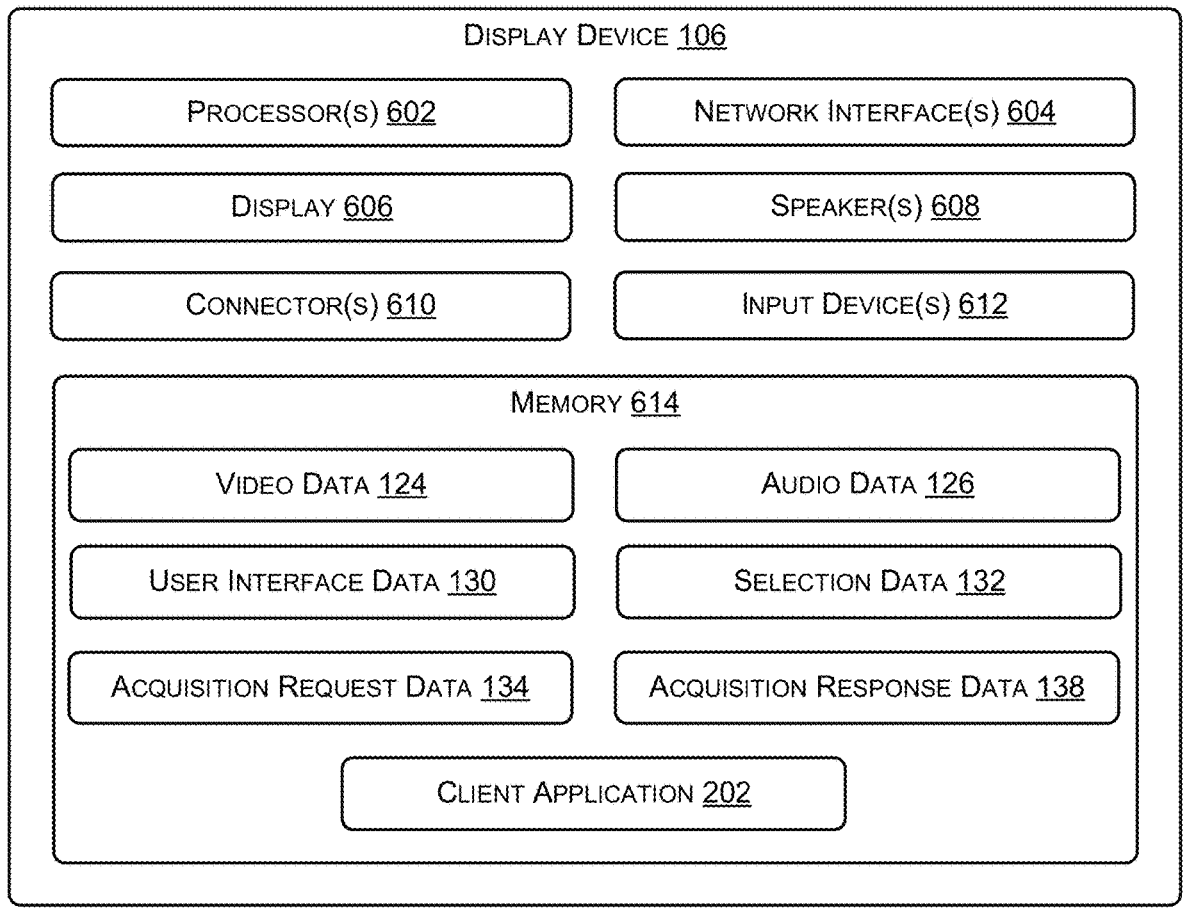
FIG. 6 illustrates a block diagram of an example architecture of a display device configured to provide add-ons associated with network applications, in accordance with examples of the present disclosure.

FIG. 6 illustrates a block diagram of an example architecture of the display device 106 configured to provide add-ons associated with network applications, in accordance with examples of the present disclosure. As shown, the display device 106 may include processor(s) 602, network interface(s) 604, a display 606, speaker(s) 608, connector(s) 610, input device(s) 612, and memory 614. In other examples, the display device 106 may not include one or more of the display 606, the speaker(s) 608, the connector(s) 610, or the input device(s) 612. Still, in other examples, the display device 106 may include one or more additional components not illustrated in the example of FIG. 6.

The connector(s) 610 may include one or more hardware devices (e.g., cable(s), Universal Serial Bus (USB) input(s), etc.) that connect the display device 106 to another device. For instance, if the display device 106 does not include the display 606, the display device 106 may use the connector(s) 610 (and/or the network interface(s) 604) to establish a connection with another device that includes a display. The display device 106 may then use that connection to cause the other device to display content, such as content represented by the video data 124. Additionally, the display device 106 may use that connection to cause the other device to output sound, such as sound represented by the audio data 126.

Figure 7A:
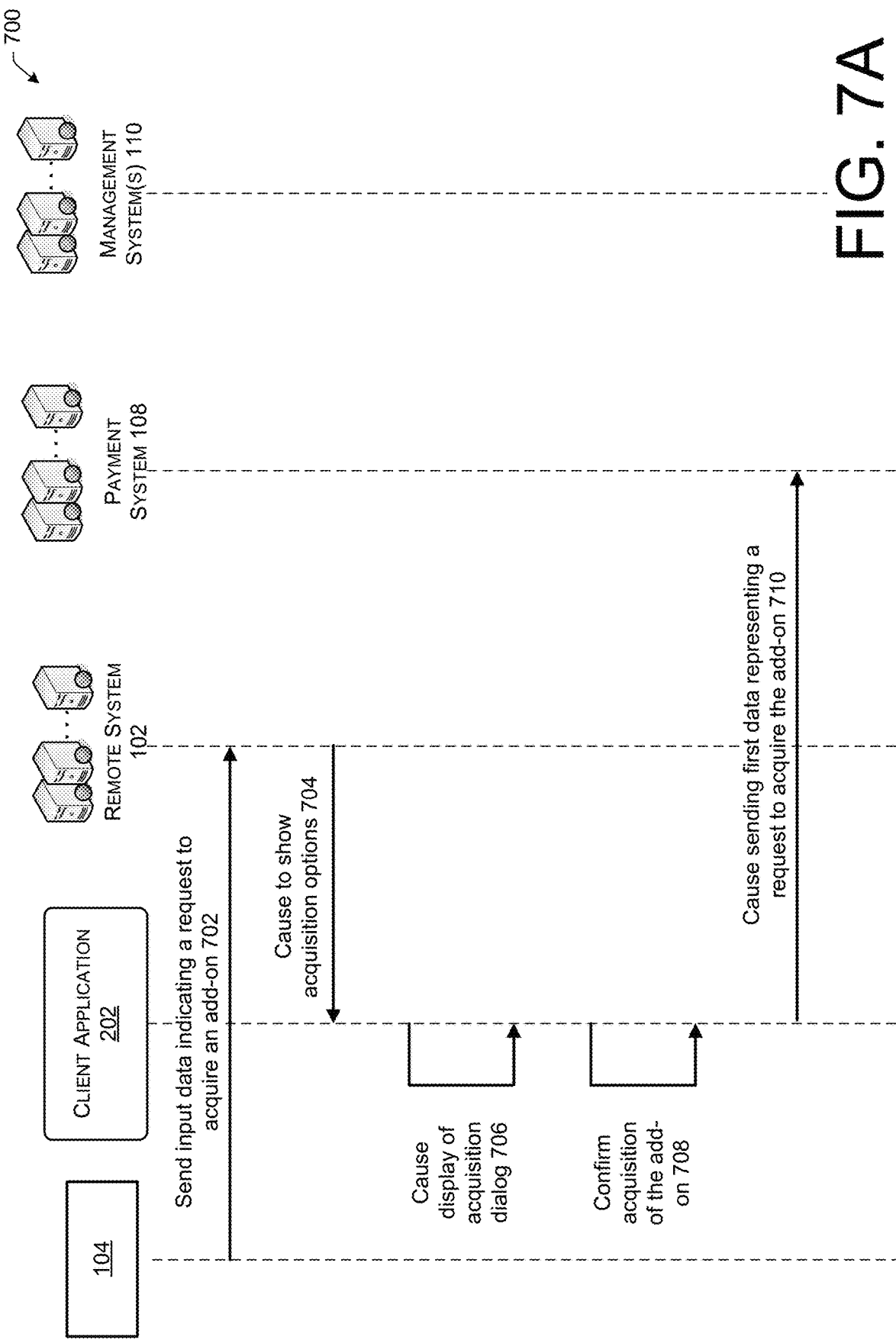
Figure 7B:
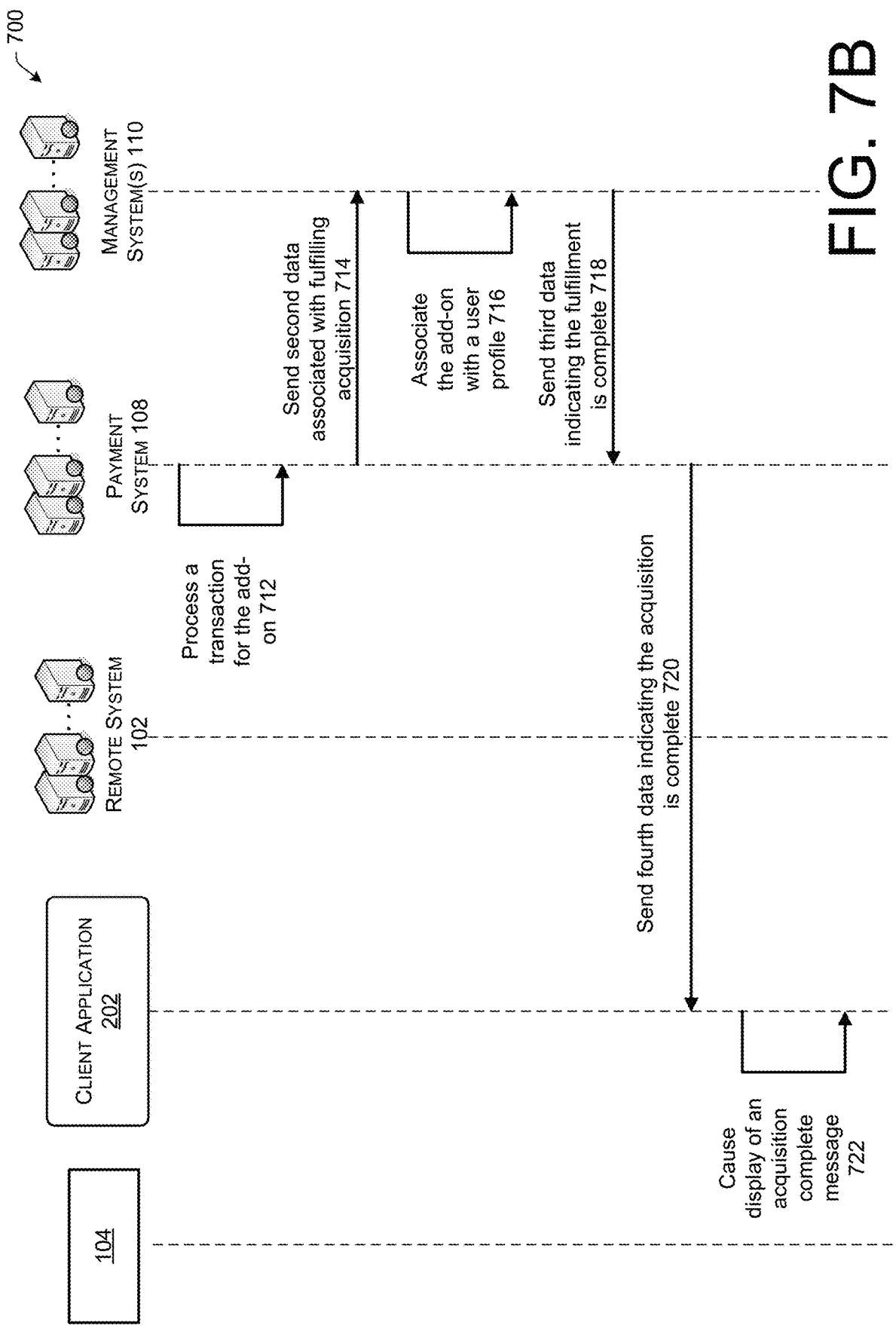

FIGS. 7A-7C illustrate a diagram representing a process 700 for acquiring an add-on associated with an application, in accordance with examples of the present disclosure. At 702, the control device 104 may send, to the remote system 102, input data 122 indicating a request to acquire an add-on. At 704, the remote system 102 may then cause the client application to show acquisition options. For instance, the remote system 102 may send user interface data 130 to the display device 106 that causes the display device 106 to show the options.

At 706, the client application 202 may cause display of acquisition dialog. For instance, the display device 106 may cause display of the options associated with acquiring the add-on. While displaying the acquisition dialog, and at 708, the client application 202 may confirm acquisition of the add-on. In some instances, to confirm the acquisition, the display device 106 may receive, from the display device 106, input data 122 confirming the acquisition. In some instances, to confirm the acquisition, the display device 106 may receive, from the remote system 102, selection data 132 indicating the confirmation of the acquisition.

At 710, the client application may cause sending, to the payment system 108, of first data representing a request to acquire the add-on. For instance, the display device 106 may send acquisition request data 134 to the payment system 108. At 712, the payment system 108 may process a transaction for the add-on. For instance, the payment system 108 may use information associated with a user account, such as payment information, to process the transaction for the price of the add-on.

At 714, the payment system 108 may send, to the management system(s) 110, second data associated with fulfilling the acquisition. At 716, the management system(s) 110 may associate the add-on with a user account. For instance, based at least in part on the second data, the management system(s) 110 may fulfill the acquisition by associating the add-on with the user account. At 718, the management system(s) 110 may then send, to the payment system 108, third data indicating the fulfillment is complete.

At 720, the payment system 108 may send, to the client application 202, fourth data indicating that the acquisition is complete. For instance, after processing the transaction, the payment system 108 may send the acquisition response data 138 to the display device 106. As such, and at 722, the client application 202 may cause display of an acquisition complete message. For instance, once the display device 106 receives the acquisition response data 138, the display device 106 may cause displaying of the message indicating that the acquisition is complete.

After displaying the message, and at 724, the client application 202 may cause display of the application. For instance, after the acquisition is complete, the display device 106 may once again display content related to the application.

At 726, the remote system 102 may send, to the management system(s) 110, fifth data representing a request for add-ons. For instance, the remote system 102 may verify that the acquisition for the add-on is complete. To do so, the remote system 102 may send the fifth data representing the request. In response, and at 728, the management system(s) 110 may send, to the remote system 102, sixth data indicating the add-on. This way, the remote system 102 verifies that the user acquired the add-on.

At 728, the client application 202 may then cause providing of the add-on. For instance, once the remote system 102 determines that the acquisition is complete, the display device 106 is able to provide the add-on associated with the application. In some instances, providing the add-on may include displaying content representing the add-on.

Figure 8B:
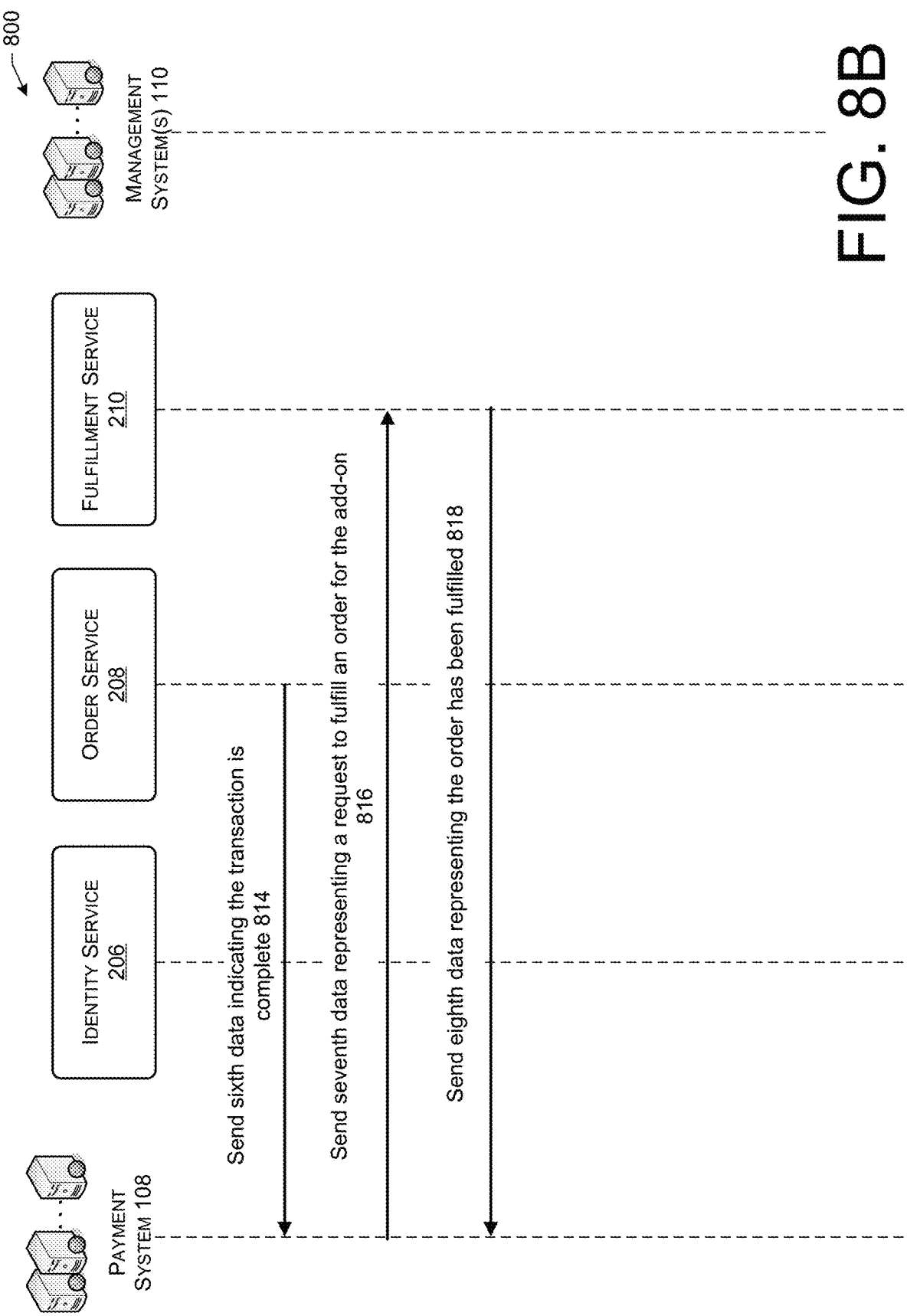

FIGS. 8A-8B illustrate a diagram representing a process 800 for processing a transaction for an add-on associated with an application, in accordance with examples of the present disclosure. In some instances, the process 800 may occur after the payment system 108 receives the acquisition request data 134 from the display device 106.

At 802, the payment system 108 sends, to the identity service 206, first data representing a request for an identifier and at 804, the identity service 206 sends, to the payment system 108, second data representing the identifier. For instance, after receiving the acquisition request data 134, the payment system 108 may verify the identity of the user 114, user account, and/or the management system(s) 110. As such, the payment system 108 may retrieve the identifier and then use the identifier to verify the user 114, the user account, and/or the management system(s) 110. In some instances, to verify the user 114, user account, and/or the management system(s) 110, the payment system 108 may determine that the retrieved identifier corresponds to (e.g., matches, etc.) an identifier represented by the acquisition request data 134.

At 806, the payment system 108 may send, to the management system(s) 110, third data representing a request for add-ons and at 808, the management system(s) 110 may send, to the payment system 108, fourth data representing the add-ons. Then, at 810, the payment system 108 may verify that an add-on is not required. For instance, the payment system 108 may retrieve the list of add-ons that are associated with the user account and use the list of add-ons to determine whether the user 114 has already acquired the add-on. In some instances, the payment system 108 may determine that the user 114 has already acquired the add-on when the add-on is associated with the user account, but verify that the user 114 has not already acquired the add-on when the add-on is not associated with the user account (e.g., the list of add-ons does not include the add-on).

At 812, the payment system 108 may send, to the order service 208, fifth data representing a request to process a transaction for the add-on and 814, the order service 208 may send, to the payment system 108, sixth data indicating that the transaction is complete. For instance, after verifying that the user 114 has not acquired the add-on, the payment system 108 may cause the transaction associated with the add-on to be compete using the order service 208. In some instances, the fifth data may include, but is not limited to, data representing the identifier of the user account, data representing the identifier of the add-on, data representing the price of the add-on, data representing payment information associated with the user account, and/or the like. The order service 208 can then use the fifth data to process the transaction.

At 816, the payment service 108 may send, to the fulfillment service 210, seventh data representing a request to fulfill an order for the add-on at 818, the fulfillment service 210 may send, to the payment service 108, eighth data representing that the order has been fulfilled. For instance, after the transaction has been processed, the payment system 108 may cause fulfillment of the order such that the user 114 is able to use the add-on.

FIGS. 9A-9B illustrate a diagram representing a process 900 for identifying add-ons that are associated with a user account, in accordance with examples of the present disclosure. As shown, the example process 900 includes an authorization service 902 and an entitlement service 904. In some instances, the authorization service 902 and/or the entitlement service 904 may be included within the payment system 108. Additionally, or alternatively, in some instances, the authorization service 902 and/or the entitlement service 904 may be included on one or more separate computing devises.

At 906, the remote system 102 may send, to the API gateway 402, first data representing a request for add-ons and at 908, the API gateway 402 may send, to the authorization service 902, second data representing a request for the add-ons. In some instances, the first data and/or the second data may include, but are not limited to, data representing an identifier of a user account, data representing an identifier of an application, and/or the like.

At 910, the authorization service 902 may authorize the request. For instance, the authorization service 902 may authorize that the identifier of the user account is associated with a valid user account, the identifier of the application is associated with a valid application, that the request is received from the API gateway 402, that a publisher associated with the application is a valid publisher, and/or the like. If the authorization service 902 does not authorize the request, then the example process 900 may stop. However, if the authorization service 902 authorizes the request, then the example process 900 may proceed to 912.

At 912, the authorization service 902 may send, to the payment system 108, third data representing a request for add-ons and at 914, the payment service 108 may send, to the entitlement service 904, fourth data representing a request for the add-ons. In some instances, the third data and/or the fourth data may include, but are not limited to, data representing the identifier of the user account, data representing the identifier of the application, and/or the like. The entitlement service 904 may then use the fourth data to determine which add-ons are associated with the user account and/or the application.

At 916, the entitlement service 904 may send, to the payment system 108, fifth data representing the add-ons. For instance, after identifying the add-ons, the entitlement service 904 may notify the payment service 108 about the add-ons. At 918, the payment system 108 may then send, to the API gateway 402, sixth data representing the add-ons and at 920, the API gateway 402 may send, to the remote system 102, seventh data representing the add-ons. As such, the remote system 102 may be notified about the add-ons.

In some instances, a similar process 900 may be performed in order for the remote system 102 to determine other information associated with the user account. For example, a similar process may be performed in order for the remote system 102 to retrieve receipts associated with add-ons that have been acquired by the user 114.

FIGS. 10A-12B illustrate various processes for providing add-on associated with network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 10A:
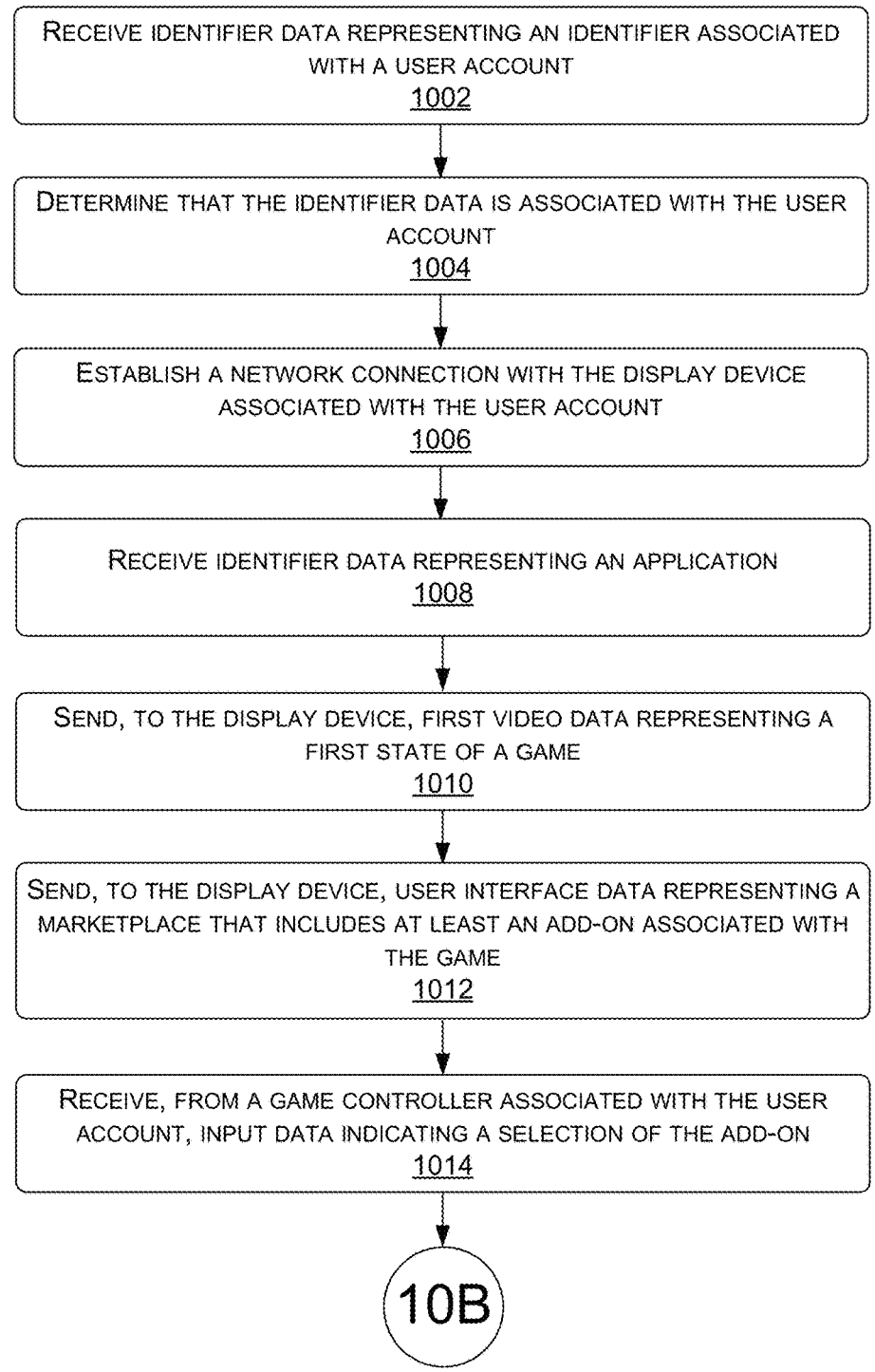
FIGS. 10A-10B illustrate an example process of a remote system providing add-ons associated with a network game, in accordance examples of the present disclosure.
Figure 10B:
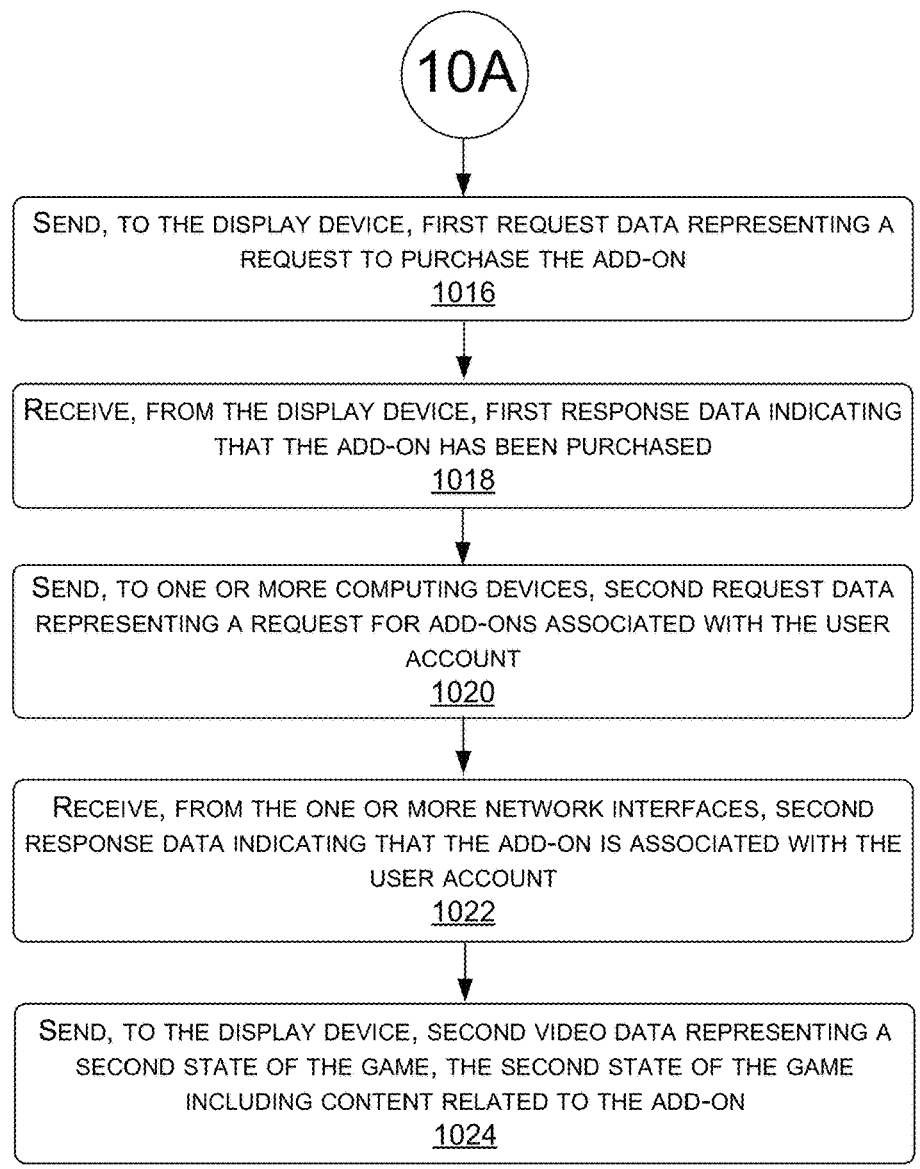

FIGS. 10A-10B illustrate an example process 1000 of the remote system 102 providing add-ons associated with a network game, in accordance examples of the present disclosure. At 1002, the process 1000 may include receiving identifier data representing an identifier associated with a user account and at 1004, the process 1000 may include determining that the identifier data is associated with the user account. For instance, the remote system 102 may receive, from the control device 104 and/or one or more other devices, the identifier data 116 representing the identifier associated with the user account. The remote system 102 may then use the profile data 118 to determine that the identifier data 116 is associated with the user account. For example, the remote system 102 may determine that the identifier represented by the identifier data 116 corresponds to an identifier represented by the profile data 118.

At 1006, the process 1000 may include establishing a communication channel with a display device associated with the user account. For instance, the remote system 102 may use the profile data 118 to determine that the display device 106 is associated with the user account and/or the control device 104. In some instances, the remote system 102 makes the determination based on the profile data 118 representing an identifier associated with the display device 106. The remote system 102 may then establish the network connection with the display device 106. In some instances, the network connection includes a streamlining instance.

At 1008, the process 1000 may include receiving identifier data representing an identifier associated with an application and at 1010, the process 1000 may include sending, to the display device, first video data representing a state of the game. For instance, the remote system 102 may receive, from the control device 104, the display device 106, and/or one or more other devices, the identifier data 116 representing the identifier associated with the application. The remote system 102 may then begin executing the application data 120 associated with the application. Additionally, the remote system 102 may send the first video data 124 to the display device 106. The display device 106 may then use the first video data 124 to cause content representing the first state of the game to be displayed (e.g., by the display device 106 and/or another device). In some instances, the remote system 102 may further send, to the control device 104, first audio data 126 that is associated with the first video data 124.

At 1012, the process 1000 may include sending, to the display device, marketplace data representing at least an add-on associated with the game. For instance, while the remote system 102 is providing the game, the remote system 102 may send, to the display device 106, the user interface data 130 representing a marketplace that includes one or more add-ons that are available for purchase for the game. The display device 106 may then use the user interface data 130 to cause the marketplace to be displayed (e.g., by the display device 106 and/or another device). The user 114 may then use the control device 104 to browse through the one or more add-ons in order to purchase at least an add-on for the game.

At 1014, the process 1000 may include receiving, from a game controller associated with the user account, input data indicating a selection of the add-on and at 1016, the process 1000 may include sending, to the display device, first request data representing a request to purchase the add-on. For instance, the remote system 102 may receive the input data 122 from the control device 104. The remote system 102 may then determine that the input data 122 represents the selection of the add-on. In response, the remote system 102 may send the acquisition request data 134 to the display device 106, where the acquisition request data 134 represents the request to purchase the add-on.

At 1018, the process 1000 may include receiving, from the display device, first response data indicating that the add-on has been purchased. For instance, the remote system 102 may receive the acquisition response data 138 from the display device 106, where the acquisition response data 138 indicates that the add-on has been purchased. In some instances, the remote system 102 may then provide the add-on for the application. In other instances, the remote system 102 may first verify that the add-on has been purchased.

For instance, at 1020, the process 1000 may include sending, to one or more computing devices, second request data representing a request for add-ons associated with the user account and at 1022, the process 1000 may include receiving, from the one or more computing devices, second response data indicating that the add-on is associated with the user account. For instance, the remote system 102 may send the request data 140 to the payment system 108 and/or the management system(s) 110, where the request data 140 represent the request for the add-ons associated with the user account. The remote system 102 may then receive the response data 144 from the payment system 108 and/or the management system(s) 110, where the response data 144 indicates that the add-on has been purchased.

At 1024, the process 1000 may include sending, to the display device, second video data representing a second state of the game, the second state of the game including content related to the add-on. For instance, the remote system 102 may send the second video data 124 to the display device 106. The display device 106 may then use the second video data 124 to cause content representing the second state of the game to be displayed (e.g., by the display device 106 and/or another device), where the second state of the game includes the add-on. In some instances, the remote system 102 may further send, to the control device 104, second audio data 126 that is associated with the second video data 124.

Figure 11:
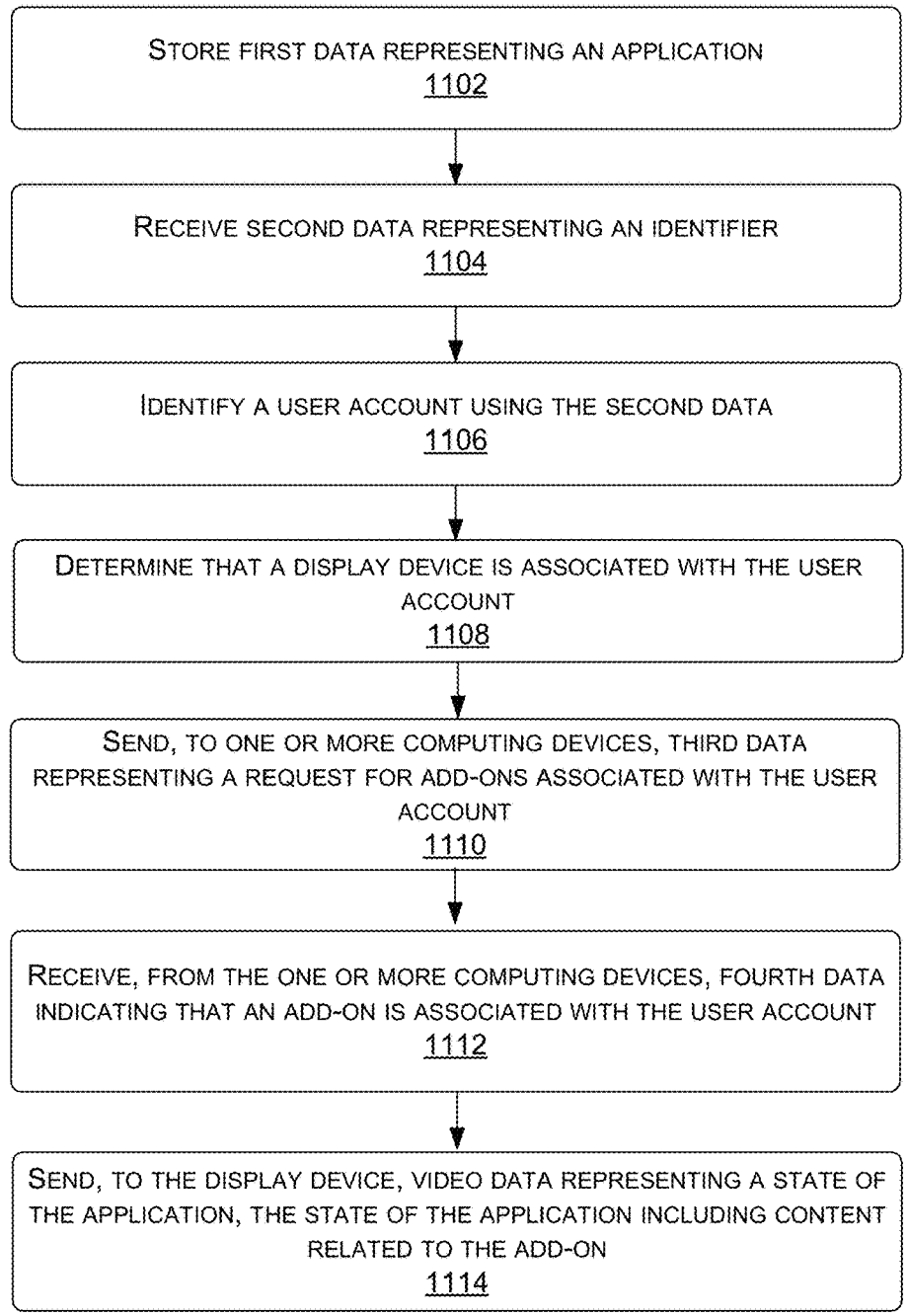
FIG. 11 illustrates an example process of a remote system providing add-ons associated with a network application, in accordance examples of the present disclosure.

FIG. 11 illustrates an example process 1100 of the remote system 102 providing add-ons associated with a network application, in accordance examples of the present disclosure. At 1102, the process 1100 may include storing first data representing an application. For instance, the remote system 102 may store the application data 120 representing applications that are accessible to users over the network(s) 112.

At 1104, the process 1100 may include receiving second representing an identifier and at 1106, the process 1100 may include identifying a user account using the second data. For instance, the remote system 102 may receive, from the control device 104, the display device 10, and/or one or more other devices, the identifier data 116 representing the identifier associated with the user account. The remote system 102 may then use the identifier data 116 to identify the user account. For example, the remote system 102 may determine that the identifier represented by the identifier data 116 corresponds to an identifier represented by the profile data 118, where the profile data 118 represents the user account.

At 1108, the process 1100 may include establishing a network connection with a display device associated with the user account. For instance, the remote system 102 may use the profile data 118 to determine that the display device 106 is associated with the user account and/or the control device 104. In some instances, the remote system 102 makes the determination based on the profile data 118 representing an identifier associated with the display device 106. The remote system 102 may then establish the network connection with the display device 106. In some instances, the network connection includes a streamlining instance.

At 1110, the process 1100 may include sending, to one or more computing devices, third data representing a request for add-ons associated with the user account and at 1112, the process 1100 may include receiving, from the one or more computing devices, fourth data indicating that an add-on is associated with the user account. For instance, the remote system 102 may send the request data 140 to the payment system 108 and/or the management system(s) 110, where the request data 140 represent the request for the add-ons associated with the user account. The remote system 102 may then receive the response data 144 from the payment system 108 and/or the management system(s) 110, where the response data 144 indicates that the add-on is associated with the user account.

At 1114, the process 1100 may include sending, to the display device, video data representing a state of the application, the state of the application including content related to the add-on. For instance, the remote system 102 may send the video data 124 to the display device 106. The display device 106 may then use the video data 124 to cause content representing the state of the application to be displayed (e.g., by the display device 106 and/or another device), where the state of the application includes the add-on.

Figure 12A:
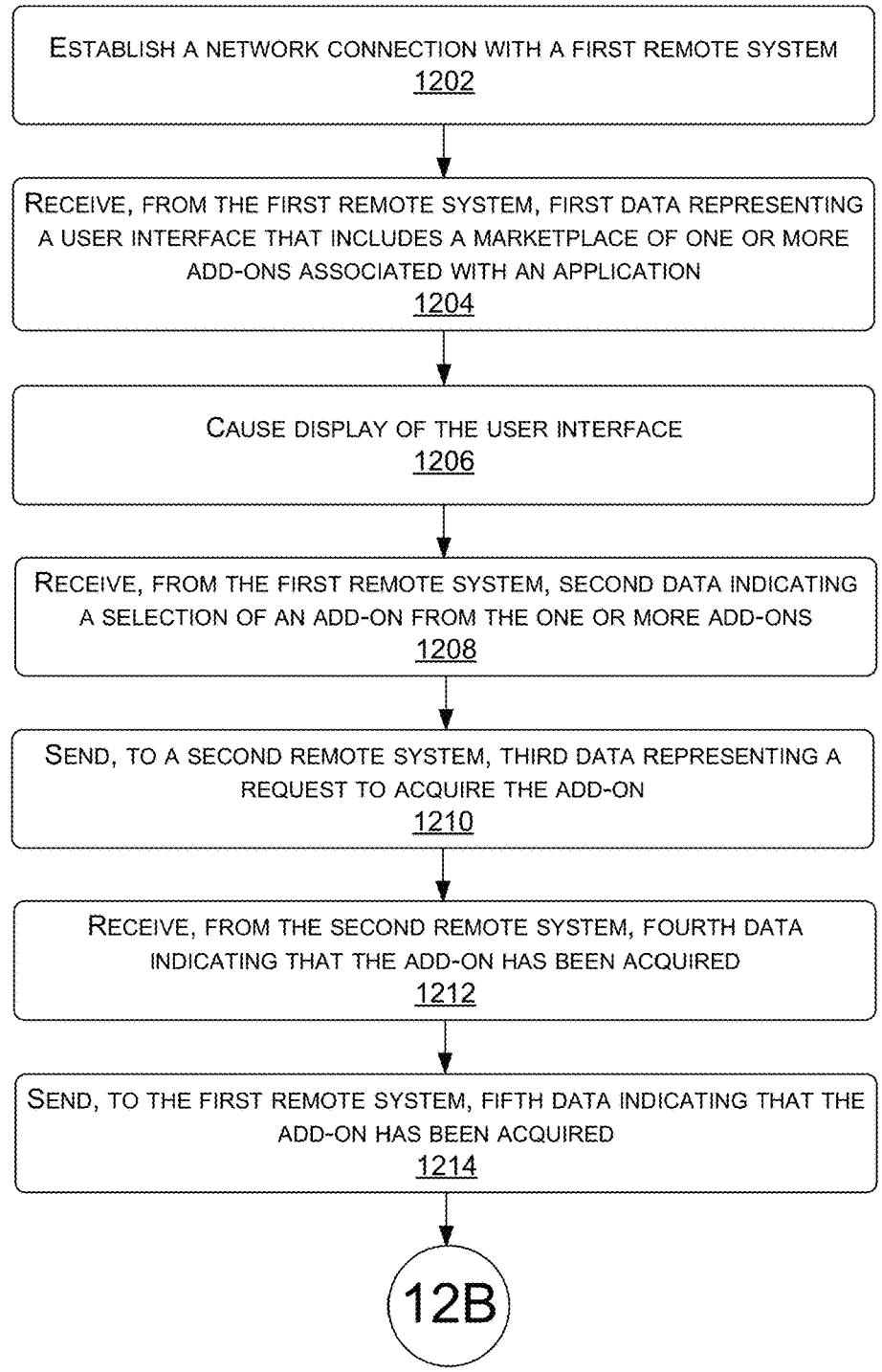
FIGS. 12A-12B illustrate an example process of a display device acquiring an add-on associated with a network application, in accordance with examples of the present disclosure.
Figure 12B:
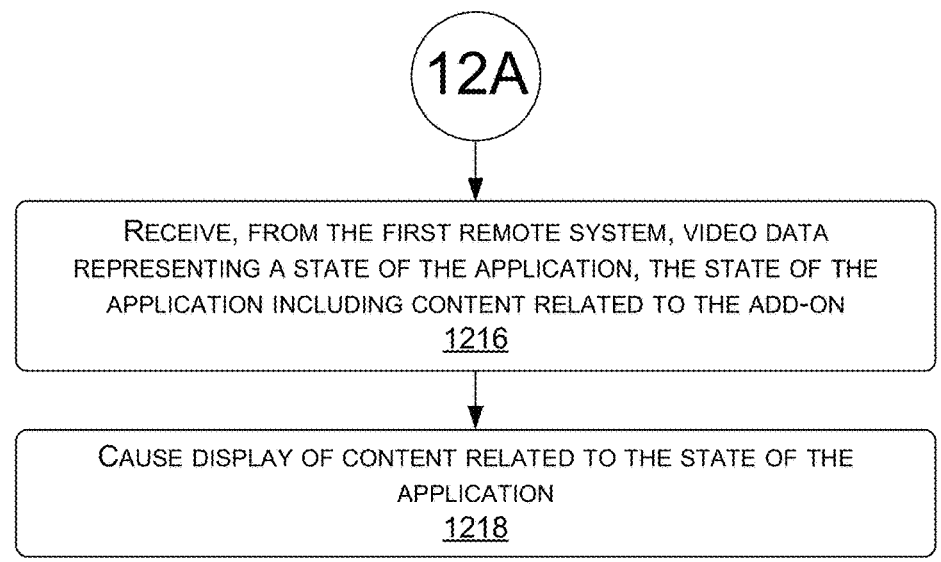

FIGS. 12A-12B illustrate an example process 1200 of the display device 106 acquiring an-add on associated with a network application, in accordance with examples of the present disclosure. At 1202, the process 1200 may include establishing a network connection with a first remote system. For instance, the display device 106 may establish the network connection with the remote system 102. In some instances, the network connection includes a streaming instance.

At 1204, the process 1200 may include receiving, from the first remote system, first data representing a user interface that includes a marketplace of one or more add-ons associated with an application and at 1206, the process 1200 may include causing display of the user interface. For instance, the display device 106 may receive the user interface data 130 from the remote system 102. The display device 106 may then cause the display of the user interface. In some instances, such if the display device 106 includes a display, causing the display may include displaying the user interface using the display. In some instances, such if the display device 106 does not include a display, causing the display may include sending data to another device that causes the other device to display the user interface.

At 1208, the process 1200 may include receiving, from the first remote system, second data indicating a selection of an add-on from the one or more add-ons. For instance, the display device 106 may receive the second data from the remote system 102. In some instances, the second data may include selection data 132 indicating that the add-on was selected by the user 114 using the control device 106. In some instances, the second data may include acquisition request data 134 representing a request to acquire the add-on.

At 1210, the process 1200 may include sending, to a second remote system, third data representing a request to acquire the add-on and at 1212, the process 1200 may include receiving, from the second remote system, fourth data indicating that the add-on has been acquired. For instance, based at least in part on the second data, the display device 106 may send, to the payment system 108, acquisition request data 134 representing the request to acquire the add-on. The display device 106 may then receive, from the payment system 108, acquisition response data 138 indicating that the acquisition of the add-on has been complete (e.g., that the add-on has been purchased).

At 1214, the process 1200 may include sending, to the first remote system, fifth data indicating that the add-on has been acquired. For instance, the display device 106 may send, to the remote system 102, acquisition response data 138 indicating that the acquisition of the add-on has been complete. In other words, the display device 106 may notify the remote system 102 that the user 114 has purchased the add-on.

At 1216, the process 1200 may include receiving, from the first remote system, video data representing a state of the application, the state of the application including content related to the add-on and at 1218, the process 1200 may include causing display of content related to the state of the application. For instance, the display device 106 may receive the video data 124 from the remote system 102. The display device 106 may then cause the display of the state of the application represented by the video data 124. In some instances, such if the display device 106 includes a display, causing the display may include displaying the content using the display. In some instances, such if the display device 106 does not include a display, causing the display may include sending data to another device that causes the other device to display the content.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A remote system comprising:
   at least one database storing:
      profile data representing a user account, the user account being associated with a gaming controller and a display device; and
      game data representing a game;
   one or more network interfaces;
   one or more processors; and
   one or more computer-readable media storing instructions that, when executed by the one or more processors, cause the one or more processors to perform operations comprising:
      establishing, using the one or more network interfaces, a communication channel with the display device;
      sending, using the one or more network interfaces and to the display device, first video data representing a first state of the game;
      sending, using the one or more network interfaces and to the display device, user interface data offering at least an add-on that is available for the game, the add-on associated with a price for purchasing the add-on;
      receiving, using the one or more network interfaces and from the gaming controller, input data indicating a selection of the add-on;
      sending, using the one or more network interfaces and to the display device, selection data indicating the selection of the add-on;
      receiving, using the one or more network interfaces and from the display device, purchase data indicating that purchasing of the add-on has been complete;
      sending, using the one or more network interfaces and to a management system, request data representing a request for add-ons associated with the user account;
      receiving, using the one or more network interfaces and from the management system, response data indicating that the add-on is available for the game; and
      sending, using the one or more network interfaces and to the display device, second video data representing a second state of the game, the second state of the game including content associated with the add-on.

2. The system as recited in claim 1, the operations further comprising:
   receiving, using the one or more network interfaces and from the management system, add-on data representing one or more add-ons that are available for purchase for the game; and
   associating the add-on data with the game data.

3. The system as recited in claim 1, wherein the communication channel is a first communication channel that is established at a first time, and wherein the operations further comprise:
   terminating the first communication channel with the display device;
   after terminating the first communication channel, establishing, using the one or more network interfaces and at a second time, a second communication channel with the display device;
   based at least in part on establishing the second communication channel, sending, using the one or more network interfaces and to the management system, additional request data representing an additional request for the add-ons associated with the user account; and
   receiving, using the one or more network interfaces and from the management system, additional response data indicating that the add-on is available for the game.

4. A method comprising:
   storing first data representing an application;
   storing second data representing a user account, the user account being associated with a control device and a display device;
   receiving third data representing an acquisition of an add-on associated with the application;

sending, to one or more computing devices, fourth data representing a request for add-ons associated with the user account;

receiving, from the one or more computing devices, fifth data representing at least the add-on; and based at least in part on receiving the fifth data, sending, to the display device, video data representing a state of the application, the state of the application including content associated with the add-on.

5. The method as recited in claim 4, further comprising:
executing the first data representing the application; and
while executing the first data, sending, to the display device, sixth data representing one or more add-ons that are available for the application, the one or more add-ons including at least the add-on.

6. The method as recited in claim 5, further comprising:
before receiving the third data, receiving, from the control device, input data indicating a selection of the add-on from the one or more add-ons; and
based at least in part on receiving the input data, sending, to the display device, seventh data representing the selection of the add-on.

7. The method as recited in claim 4, further comprising:
before receiving the third data, receiving, from a client device associated with the user account, sixth data representing a request to acquire the add-on; and
based at least in part on receiving the sixth data, sending, to the display device, seventh data that causes the display device to initiate acquisition of the add-on.

8. The method as recited in claim 4, further comprising:
establishing a communication channel with the display device,
and wherein sending the fourth data representing the request for the add-ons is based at least in part on establishing the communication channel.

9. The method as recited in claim 4, further comprising:
sending, to the display device, sixth data representing one or more first add-ons that are available for the application;
receiving, from the control device, seventh data representing an input associated with viewing one or more second add-ons that are available for the application; and
based at least in part on receiving the seventh data, sending, to the display device, seventh data representing the one or more second add-ons that are available for the application.

10. The method as recited in claim 4, further comprising sending, to the display device, sixth data representing at least:
the add-on that is associated with the application;
a type of add-on associated with the add-on; and
a price of the add-on.

11. The method as recited in claim 4, further comprising:
receiving, from the one or more computing devices, sixth data representing one or more add-ons that are available for the application; and
storing the sixth data representing the one or more add-ons in association with the first data representing the application.

12. The method as recited in claim 4, further comprising:
receiving, from the control device, input data indicating a selection of the application; and
and wherein sending the fourth data representing the request for the add-ons is based at least in part on the receiving the input data.

13. The method as recited in claim 4, further comprising:
determining one or more updates associated with the add-on; and
sending, to the one or more computing devices, sixth data indicating the one or more updates associated with the add-on.

14. The method as recited in claim 4, wherein sending the fourth data representing the request for add-ons associated with the user account comprises sending, to the one or more computing devices, the fourth data representing at least one of:
an identifier associated with the user account;
an identifier associated with the application; or
a request for the add-ons.

15. The method as recited in claim 4, wherein receiving the fifth data representing at least the add-on comprises receiving, from the one or more computing devices, the fifth data representing at least one of:
a consumable add-on that is available until expiration;
a durable add-on that is available when the application is executed; or
a subscription add-on that is acquired at the expiration of a time period.

16. A system comprising:
one or more network interfaces;
one or more processors; and
one or more computer-readable media storing instructions that, when executed by the one or more processors, cause the one or more processors to perform operations comprising:
receiving first data representing an identifier associated with a user account;
based at least in part on receiving the first data, establishing, using the one or more network interfaces, a network connection with a display device associated with the user account;
sending, using the one or more network interfaces and to one or more computing devices, second data representing a request for add-ons associated with the user account;
receiving, using the one or more network interfaces and from the one or more computing devices and over the network, third data indicating an add-on acquired for the application; and
sending, using the one or more network interfaces and via the network connection, video data to the display device, the video data representing a state of the application that includes content associated with the add-on.

17. The system as recited in claim 16, the operations further comprising:
sending, using the one or more network interfaces and via the network connection, fourth data to the display device, the fourth data representing one or more add-ons associated with the application;
receiving, using the one or more network interfaces and from the control device, input data representing a selection of the add-on from the one or more add-ons; and
sending, using the one or more network interfaces and via the network connection, fifth data to the display device, the fifth data representing the selection of the ad-on.

18. The system as recited in claim 16, the operations further comprising:
receiving, using the one or more network interfaces and from a client device, fourth data representing a request to acquire the add-on; and sending, using the one or more network interfaces and to the display device, fourth data representing a command to acquire the add-on.

19. The system as recited in claim 16, the operations further comprising:
receiving, using the one or more network interfaces and via the network connection, fourth data from the display device, the fourth data indicating that the add-on has been acquired,
and wherein sending the second data representing the request for the add-ons associated with the user account is based at least in part on receiving the fourth data.

20. The system as recited in claim 16, the operations further comprising:
sending, using the one or more network interfaces and via the network connection, fourth data to the display device, the fourth data representing one or more first add-ons associated with the application;
receiving, using the one or more network interfaces and from the control device, input data representing a selection to view one or more second add-ons associated with the application; and
based at least in part on receiving the input data, sending, using the one or more network interfaces and via the network connection, fifth data to the display device, the fifth data representing the one or more second add-ons associated with the application.

\* \* \* \* \*